United States Patent
Hoffman et al.

(10) Patent No.: US 12,138,496 B2
(45) Date of Patent: Nov. 12, 2024

(54) PERSONAL PROTECTIVE EQUIPMENT FACE COVERINGS WITH INHERENTLY IONIC MATERIAL

(71) Applicant: ION CLAIRETY, LLC, Cornelius, NC (US)

(72) Inventors: Kenneth L. Hoffman, Cornelius, NC (US); Sandra S. Bodek, Cornelius, NC (US); Sharon Hoffman, Rose Hill, KS (US); John Mcgowan, Wichita, KS (US)

(73) Assignee: ION CLAIRETY, LLC, Cornelius, NC (US)

( * ) Notice: Subject to any disclaimer, the term of this patent is extended or adjusted under 35 U.S.C. 154(b) by 9 days.

(21) Appl. No.: 17/764,449

(22) PCT Filed: Nov. 30, 2021

(86) PCT No.: PCT/US2021/061292
§ 371 (c)(1),
(2) Date: Mar. 28, 2022

(87) PCT Pub. No.: WO2022/119866
PCT Pub. Date: Jun. 9, 2022

(65) Prior Publication Data
US 2024/0042252 A1 Feb. 8, 2024

Related U.S. Application Data

(60) Provisional application No. 63/119,693, filed on Dec. 1, 2020.

(51) Int. Cl.
*A41D 13/11* (2006.01)
*A41D 23/00* (2006.01)
(Continued)

(52) U.S. Cl.
CPC ........ *A62B 23/025* (2013.01); *A41D 13/1161* (2013.01); *A41D 13/1192* (2013.01);
(Continued)

(58) Field of Classification Search
CPC ............ A41D 13/1161; A41D 13/1192; A41D 23/00; A41D 2500/20; A62B 18/08;
(Continued)

(56) References Cited

U.S. PATENT DOCUMENTS

2004/0078869 A1   4/2004   Bell et al.
2007/0048358 A1   3/2007   Schorr et al.
(Continued)

FOREIGN PATENT DOCUMENTS

DE   102016121823   5/2018
WO   2018068100     4/2018

OTHER PUBLICATIONS

International Search Report and Written Opinion dated Feb. 28, 2022, issued in corresponding International Application No. PCT/US2021/061292.

*Primary Examiner* — Keri J Nelson
(74) *Attorney, Agent, or Firm* — Jeffrey C. Watson, Esq.; Grell & Watson Patent Attorneys LLC

(57) ABSTRACT

A personal protective equipment face covering includes at least one layer. Each of the at least one layers includes at least one fabric material. Wherein, each of the at least one layers of the at least one fabric material including an inherently ionic material. Wherein an ionic charge on the inherently charged ionic material comes from a molecular structure, not from electrostatic charge or triboelectricity.

20 Claims, 26 Drawing Sheets

(51) Int. Cl.
| | |
|---|---|
| A62B 18/08 | (2006.01) |
| A62B 23/02 | (2006.01) |
| B01D 39/08 | (2006.01) |
| B01D 46/00 | (2022.01) |
| B03C 3/155 | (2006.01) |
| B03C 3/32 | (2006.01) |
| B32B 3/08 | (2006.01) |
| B32B 5/02 | (2006.01) |
| B32B 5/06 | (2006.01) |
| B32B 5/26 | (2006.01) |
| B32B 37/18 | (2006.01) |
| B32B 38/00 | (2006.01) |

(52) U.S. Cl.
CPC .............. *A41D 23/00* (2013.01); *A62B 18/08* (2013.01); *B01D 39/083* (2013.01); *B01D 46/0032* (2013.01); *B03C 3/155* (2013.01); *B03C 3/32* (2013.01); *B32B 3/08* (2013.01); *B32B 5/024* (2013.01); *B32B 5/073* (2021.05); *B32B 5/263* (2021.05); *B32B 37/182* (2013.01); *A41D 2500/20* (2013.01); *B01D 2239/0613* (2013.01); *B01D 2239/0659* (2013.01); *B01D 2239/10* (2013.01); *B01D 2275/10* (2013.01); *B01D 2279/40* (2013.01); *B32B 2038/008* (2013.01); *B32B 2250/20* (2013.01); *B32B 2262/0276* (2013.01); *B32B 2262/08* (2013.01); *B32B 2305/188* (2013.01); *B32B 2307/20* (2013.01); *B32B 2307/724* (2013.01); *B32B 2317/10* (2013.01); *B32B 2367/00* (2013.01); *B32B 2437/00* (2013.01); *B32B 2571/00* (2013.01)

(58) Field of Classification Search
CPC ................ A62B 23/025; B01D 39/083; B01D 46/0032; B01D 2239/0613; B01D 2239/0659; B01D 2239/10; B01D 2279/40; B03C 3/155; B03C 3/32; B32B 3/08; B32B 5/024; B32B 5/073; B32B 5/263; B32B 37/182; B32B 2038/008; B32B 2250/20; B32B 2262/0276; B32B 2262/08; B32B 2305/188; B32B 2307/20; B32B 2307/724; B32B 2317/10; B32B 2367/00; B32B 2437/00; B32B 2571/00
See application file for complete search history.

(56) References Cited

U.S. PATENT DOCUMENTS

| | | |
|---|---|---|
| 2012/0111344 A1 | 5/2012 | Goranov et al. |
| 2018/0001244 A1 | 1/2018 | Zhu et al. |
| 2018/0168258 A1 | 6/2018 | Solle et al. |
| 2019/0078239 A1 | 3/2019 | Ando et al. |
| 2019/0174845 A1 | 6/2019 | Cheng et al. |
| 2020/0178628 A1* | 6/2020 | Merrill ...................... A41F 9/02 |

* cited by examiner

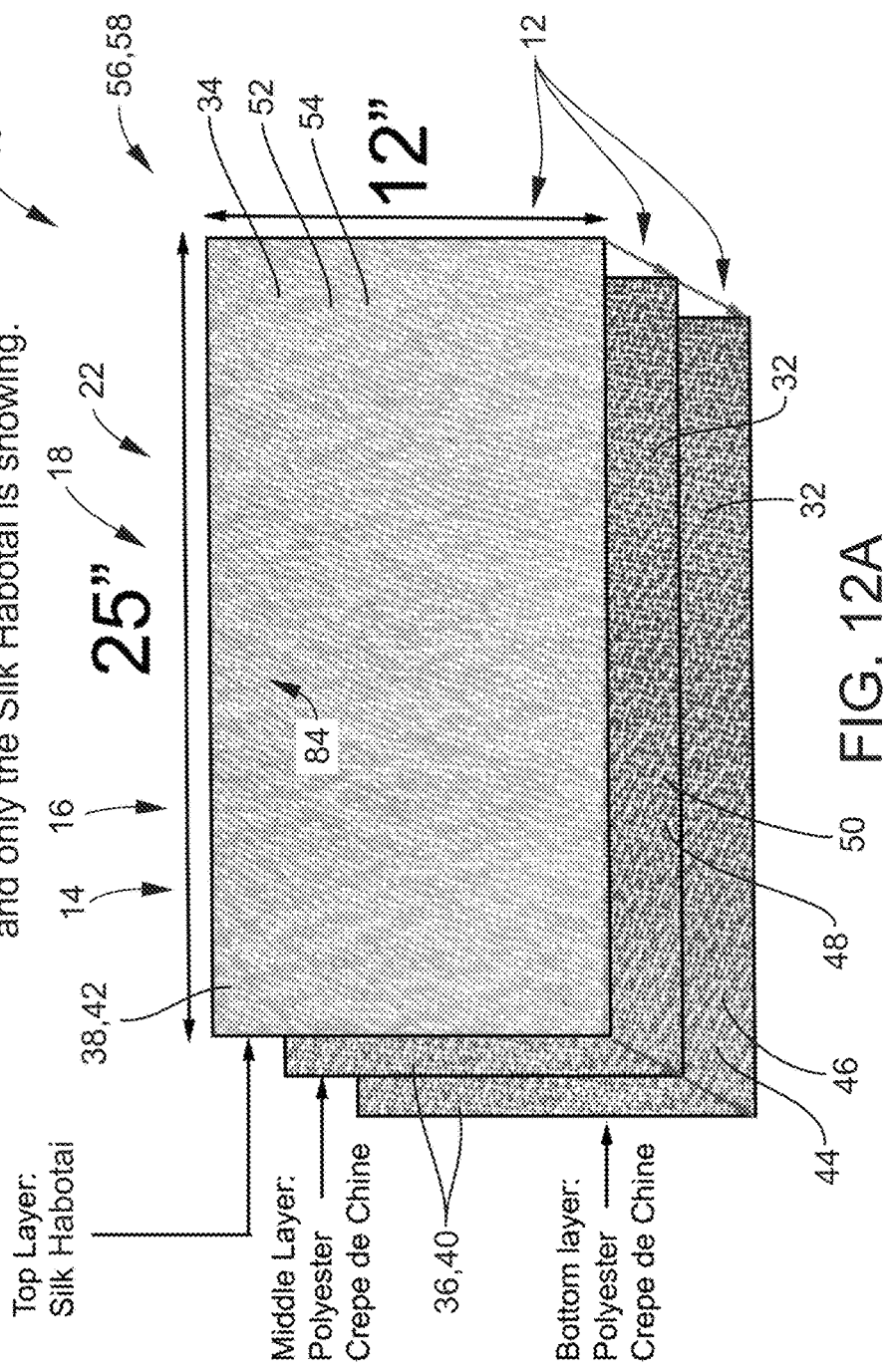

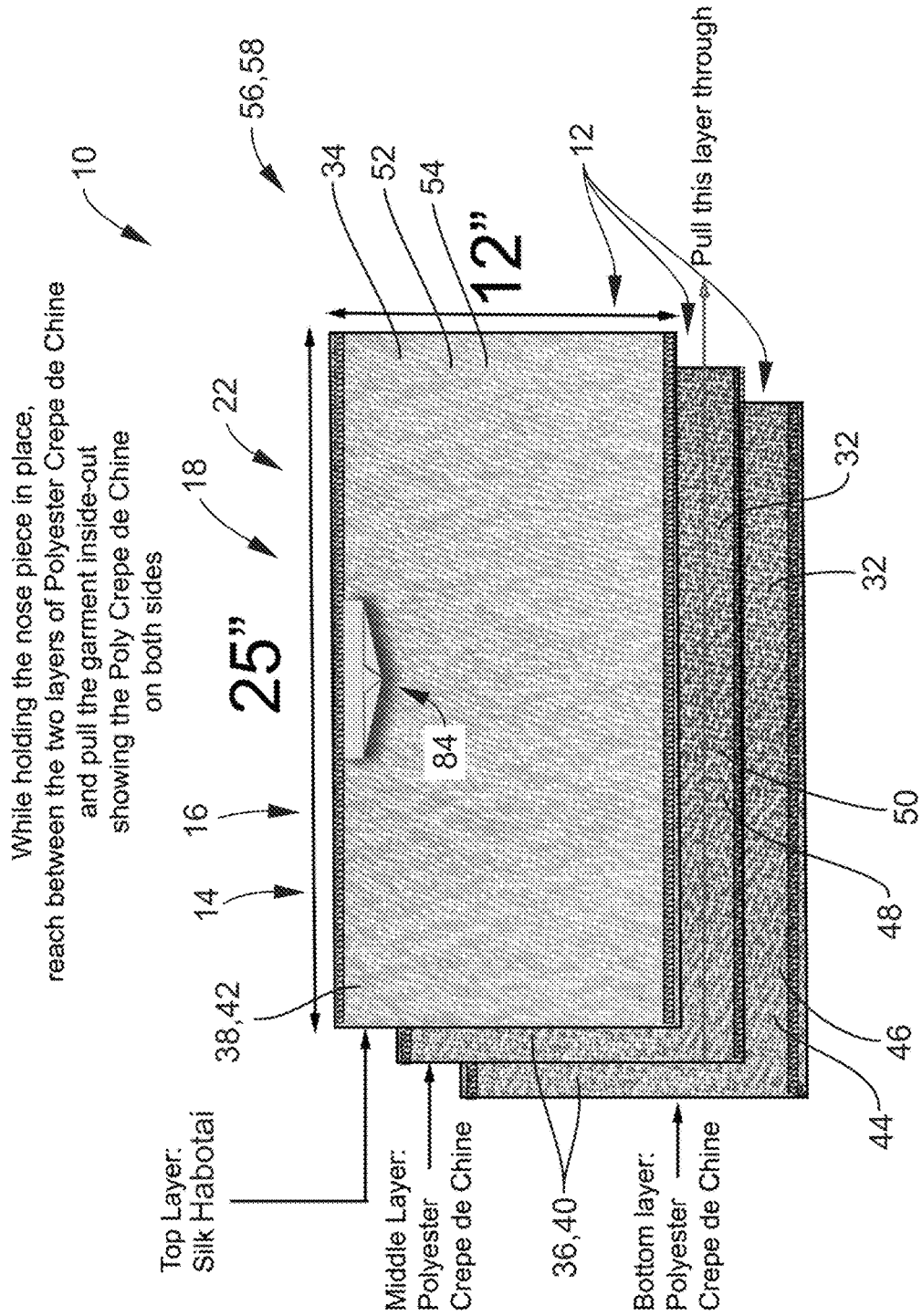

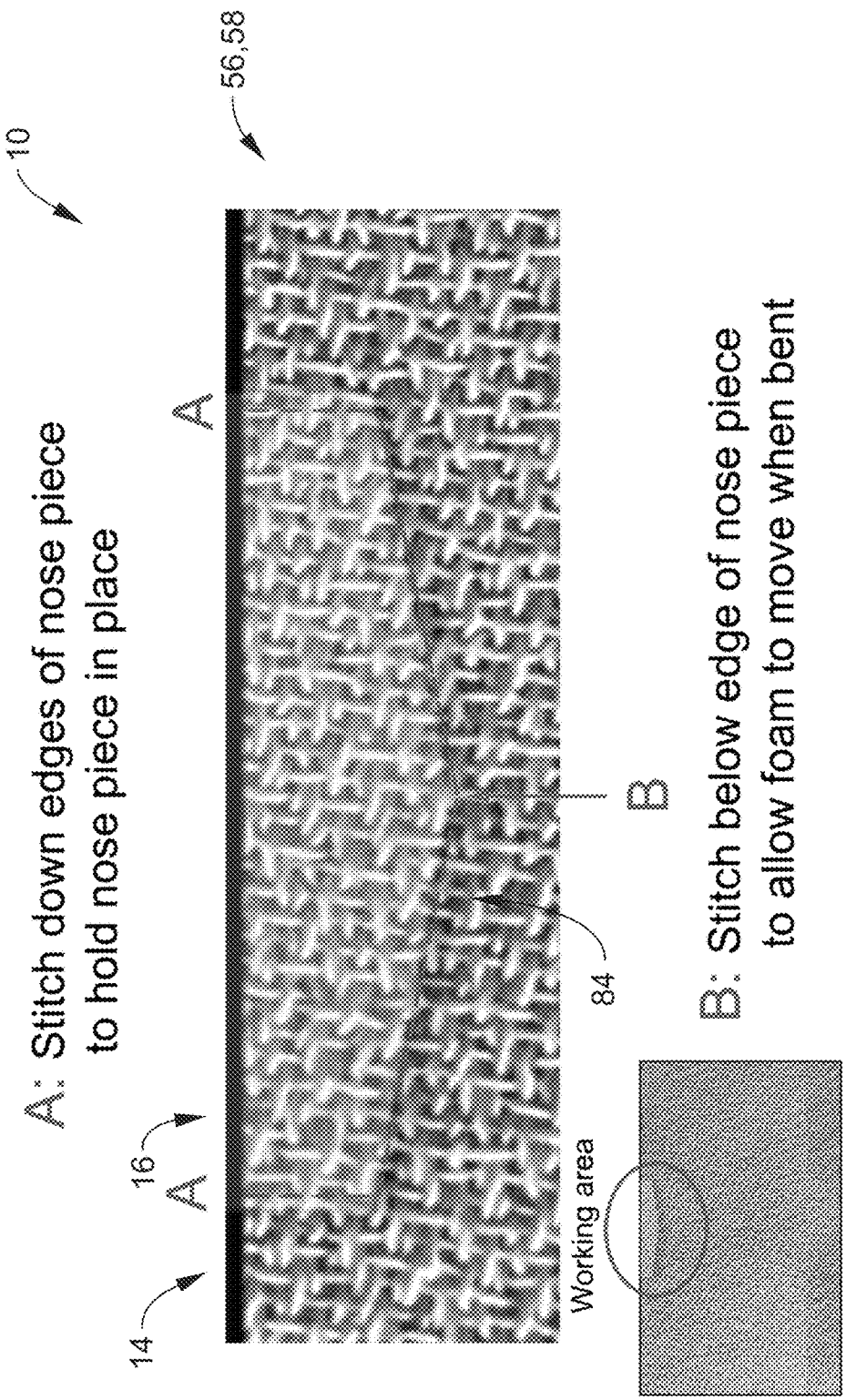

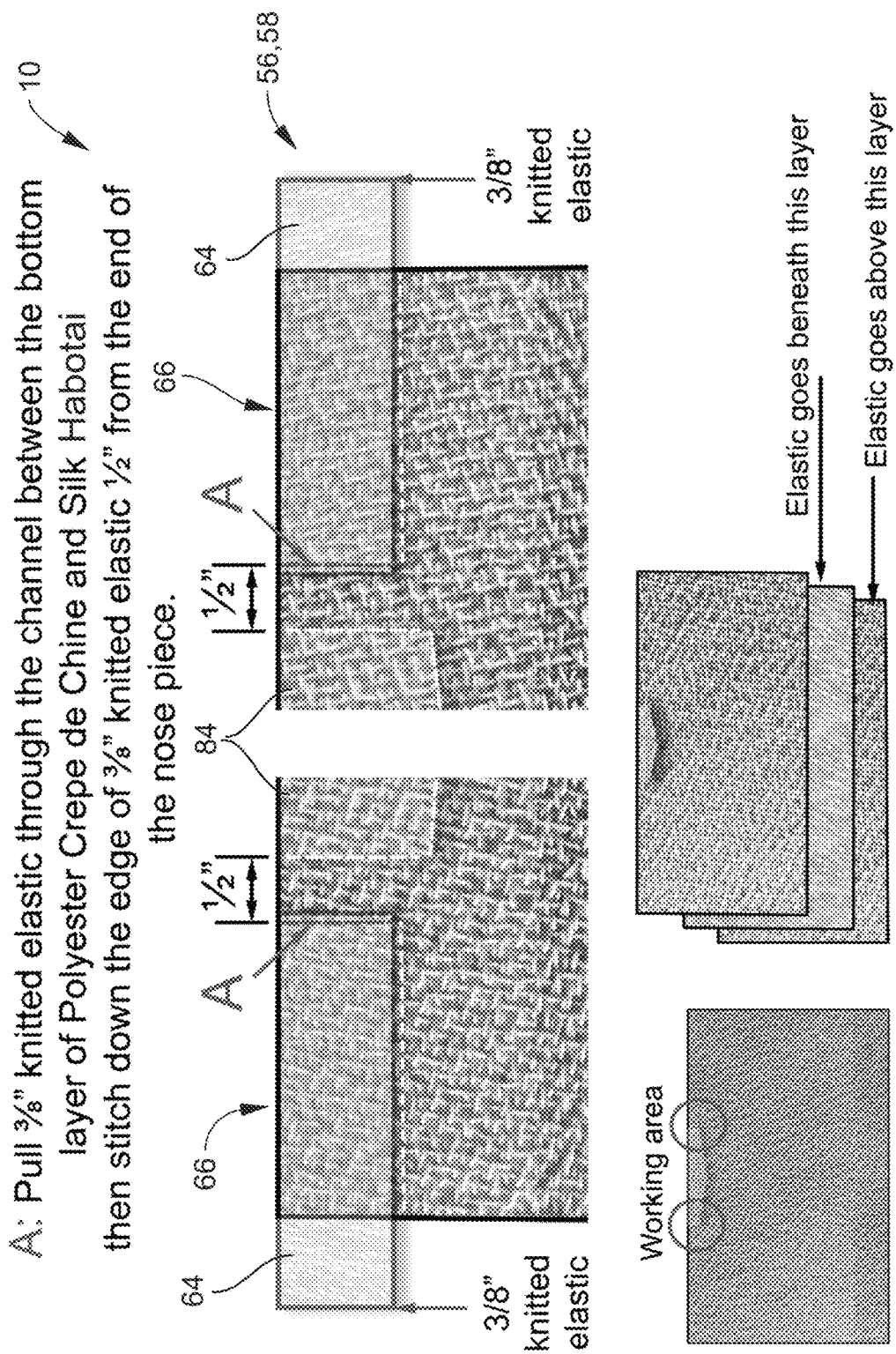

Step 10

** First turn garment over so that the back of the garment is facing up

A: Using Stretch Stitch, stitch elastic down 1/4" up from bottom along left edge
B: Using Stretch Stitch, stitch top of elastic down while keeping constant stretch on elastic
C: Using Stretch Stitch, stitch elastic down, 1/4" up from bottom along right edge
D: Using Stretch Stitch, stitch bottom of elastic down while keeping constant stretch on elastic
E: Trim off excess elastic

FIG. 12J

PERSONAL PROTECTIVE EQUIPMENT FACE COVERINGS WITH INHERENTLY IONIC MATERIAL

FIELD OF THE DISCLOSURE

The present disclosure is related to face covering personal protective equipment ("PPE"), like a face covering, and more specifically, a gaiter facemask, a wrap, and a scarf. Namely, the present disclosure is directed toward PPE face coverings with inherently ionic material, like a gaiter facemask, a wrap, and/or a scarf with inherently ionic material.

BACKGROUND

Conventional personal protection equipment ("PPE") face filtering masks have acknowledged limitations for filtration of infectious disease microbes. This disclosure may quantitate several performance parameters of conventional devices generally classified as surgical masks and N95 respirators. Data is presented showing the value of using more rigorous and relevant quantitative methods to comprehensively characterize performance of all face covering devices. Those same characterization methods were used by the disclosure to evaluate new designs and materials that achieve significant improvements in filtration efficiency, ease of fit and comfort over conventional surgical masks and N95 respirators.

The present disclosure is directed toward face-covering devices intended for use in medical venues with filtering microbes. The National Institute of Occupational Safety and Health (NIOSH) under Occupational Safety and Health Administration (OSHA) and the Center for Disease Control (CDC) is tasked with certification and approval of respiratory protection devices for industrial application under 42 CFR Part 84. When a respiratory device is intended for medical applications, the Federal Food and Drug Administration (FDA) has authority through the Center of Devices and Radiological Health under the Federal Food, Drug and Cosmetic Act with guidelines published in 21 CFR 878.404 (see also American Society of Testing and Materials (ASTM F2100-07)). Because the test criteria are identical for the critical parameters of filtering efficiency and breathability, NIOSH and FDA have a Memo of Understanding (MOU 225-18-006) describing how the 2 agencies will collaborate to minimize redundant premarket approval processes and to resolve any areas of conflict. Devices first submitted to FDA must then be certified by NIOSH before marketing. The basic difference between an industrial N95 and a surgical N95 is that the surgical N95 is also tested for biological fluid resistance, bacteria challenge and flame retardancy. The International Organization for Standardization (ISO) also provides guidance on respiratory protection devices (see ISO guidelines 10993-5, 16900-1:2019, & 1740-1&2). ISO and the FDA cooperate to harmonize methods and specifications and, as a result, ISO guidelines are not significantly different from FDA and NIOSH.

There are several other classifications of respiratory protection devices with more or less efficiency that are not compared in this work. For example, P100 devices are certified to filter more than 99.9% of some particles and are typically used in conjunction with ancillary protective clothing such as face shields, gowns etc. P100 devices are more expensive and problematic to use effectively and thus tend to be reserved for areas where a much higher level of protection is required due to the presence of known highly pathologic agents. Surgical masks and N95 respirators/masks are the most widely used first-line devices for minimizing transmission of airborne disease agents and as such are commonly worn by both medical personnel, first responders and the general public.

The simplest design commonly used in medical settings is the surgical mask. Surgical masks can filter out some aerosolized microbes and thus reduce the likelihood of infection for the wearer. Perhaps a more important function of surgical masks is when worn by infected persons, this device will help protect healthy individuals by minimizing the microbes they shed into the air from talking, sneezing and coughing. Conventional surgical masks consist of one or more layers of a non-woven filter matrix, typically cotton or some synthetic polymer, held in place over the nose and mouth by loops placed over the ears. The relative loose fit of those devices means they are only minimally effective. Microbes can still enter or exit around the periphery of the mask. The shortage of personal protective equipment (PPE) caused by the COVID-19 pandemic resulted in a proliferation of "home-made" masks made from common woven fabrics like cotton-polyester. In addition, many existing companies from unrelated industries have re-tooled their manufacturing plants to meet the demand. While the instant disclosure does not test the myriad of surgical masks offered since the pandemic, the instant disclosure recognizes that the basic design is fundamentally problematic and consistently fails to achieve high-efficiency capture of microbes due to poor fit around the nose and face. The instant disclosure notes that testing of carefully fitted surgical masks yielded an average efficiency ~42% in reducing airborne contaminants from inhaled air.

When properly fitted, a more effective face mask design is the N95 mask or respirator as they are also termed. Compared to surgical masks, N95-like devices may use a superior filtration matrix combined with a tighter fit. The most critical specification for N95 masks for both industrial and medical applications is that they filter >95% of particles sizes ≥0.3 microns when properly fitted under the testing conditions. The testing device and methods used to determine particles evading filtration by the device can be obtained through the National Personal Protective Technology Laboratory (NPPTL) under NIOSH. The N95 rating is measured by the ability to filter out more than 95% of arbitrary, non-infectious "test particles" such as a 2% NaCl solution and corn oil suspension after proper fit. N95 masks function primarily by mechanical filtration. Particles too large to get through the filter matrix pores or otherwise impacted on the filter matrix are filtered out. The device is placed over the nose and mouth and held tightly in place by a fitted, adjustable nose piece and elastic bands stretched over the head and behind the neck. To exclude microbes and other small contaminants like pollen and hazardous dust, the effective pore size of the filter matrix must be small. The major drawback of mechanical filtration is that the filter matrix inhibits air flow causing breathability problems. It is this inhibition of air flow that creates most of the limitations for the N95 design. These limitations of the N95 design include:

- Best fit is critical to performance but difficult to obtain and maintain. Improperly fitted masks are known to greatly reduce the filtration efficiency. To work at highest efficiency, regulations require the wearer be trained on proper use and fit of N95 masks.
- The tight elastic band fit and the pinched nose piece cause discomfort to the face of the wearer. In addition to skin irritation, many wearers report headache from the long-term compression of the mask around the head and face.

Heat accumulation inside the mask results in non-compliance for proper fit or failure to wear the mask at times when it is most needed.

Moisture from exhaled air makes the mask damp. This dampness may cause an offensive odor for the wearer. As the matrix gets saturated with vapor it becomes even harder to breathe, further reducing its particle filtration capabilities.

Restriction of breathing is problematic for people with respiratory and heart problems to the point the mask is not recommended.

Exhaled air escaping around the edges of the mask can fog eyeglasses, goggles and face shields impairing vision.

N95 design modifications are available with a 1-way pressure valve to allow for less restrictive escape of exhaled air, but this feature still does not eliminate heat, moisture and air flow restriction. Furthermore, any mask with a 1-way valve will not be effective for protecting others in close proximity as the infected wearer's exhaled air will not pass through the filter matrix.

Social stigma, whereby the masks tell the world either the wearer is infected and, thus to be avoided, or the wearer believes others are infected and wishes to avoid them.

The N95 mask will only approach its maximum efficiency if it is tightly fitted to each wearer's face. Perfect fit is difficult to achieve and maintain in actual use. Face size and shape varies for individuals and facial hair also prevents a good seal. These factors together with comfort limitations previously discussed, often result in users failing to fit the mask properly or distaining mask use altogether. Table 1 below demonstrates filtering efficiency of the N95 with variations in fit. Particles evading the mask were counted using a sensitive laser air particle counting instrument equipped with an air pump controlling the air flow rate. The particle counting instrument uses laser detection to count particles in the size range of 0.1 to >1 micron, these sizes are inclusive of bacteria, virus, mold and fungus.

TABLE 1

N95 Filtration Efficiency as a Function of Variations in Fit

| N95 Mask Fit | Total Unfiltered Particles (in 10 liters of air) | % Reduction from Ambient Air (1 − (unfiltered/ambient)) |
| --- | --- | --- |
| No mask, ambient air | 6273 | Not applicable |
| Poor fit | 3339 | 46.8% |
| Practical fit | 1240 | 80.1% |
| Perfect Seal fit | 166 | 97.4% |

The N95 mask is fitted over the manikin face. Holes in the nose and mouth of the manikin join to a sinus-like cavity inside the head. A tube through the rear of the manikin head connects the particle counter to the sinus-like cavity. Particle counts were measured under conditions of a "Poor" fit, a typical or "Practical" fit, and a "Perfect Seal" fit.

The "Poor" fit is defined as a mask not tightly fitted. This condition is evidenced by occasional small gaps between the mask and skin as is commonly seen when the nose piece has not been tightly fitted, the mask is not the proper size for the head and face shape, when facial hair is present, and/or the mask fit has been altered during wear. The gaps observed with the poor fit were measured to be less than 2 mm. The filtering efficiency of a poorly fit mask was on average 46.8%.

The "Practical" fit was achieved by using a mask well sized to the manikin and optimally fitted as is specified in the package insert directions for the N95 mask. To achieve a tight fit the nose piece was carefully adjusted. The two elastic bands stretched at a high tension with the top band around the head and the lower band under the ears and around the back of the neck. Under this condition, no visible gaps more than 1 mm could be observed during actual wear. The average particle removal efficiency for this fit was 80.1%.

The "Perfect Seal" fit is one which cannot be practically achieved in actual wear because the seal around the face and nose would be prohibitively uncomfortable. For this experiment the mask circumference was sealed with a bonding material over the manikin such that no air could go around the mask but only directly through the filter matrix. The Perfect Seal data shows the inherent ability of the matrix to filter out particles independent of mask fit. The Perfect Seal fit gave 97.4% particle filtering which is in close agreement with the NIOSH specification of 95%.

The range of fits between Poor and Practical represent what are commonly seen in actual use. This data shows that fit is critical to mask function and that under practical use conditions, N95 masks perform significantly below 95% efficiency.

Therefore, a need exists for an improved PPE facemask design that addresses at least some of the problems noted above. The instant disclosure may be designed to address at least certain aspects of the problems or needs discussed above by providing a PPE face covering with inherently ionic material, like a gaiter facemask, a wrap, and/or a scarf with inherently ionic material.

SUMMARY

The present disclosure may solve the aforementioned limitations of the currently available PPE devices, by providing the disclosed PPE face covering with inherently ionic material, like the disclosed gaiter facemask, the disclosed wrap face covering, or the disclosed scarf face covering, all with the disclosed inherently ionic material. As such, the disclosed personal protective equipment face covering may generally include at least one layer. Each of the at least one layers may include at least one fabric material. Wherein, each of the at least one layer of the at least one fabric material may include an inherently ionic material.

One feature of the disclosed personal protective equipment face covering may be that an ionic charge on the inherently ionic material comes from a molecular structure. Accordingly, the ionic charge on the inherently ionic material is not from electrostatic charge or triboelectricity.

Another feature of the disclosed personal protective equipment face covering may be that each of the at least one fabric materials may comprise open weave fabrics. These open weave fabrics may be configured to allow unrestricted airflow for inhalation and exhalation. Whereby, the disclosed personal protective equipment face covering with inherently ionic materials may be configured to allow less air to escape around a periphery of the personal protective equipment face covering compared to a conventional PPE mask. In select embodiments, the personal protective equipment face covering may be configured to encircle a neck and a face area of a wearer, thereby protecting a greater area of skin compared to a conventional PPE mask. Accordingly, a greater filtration surface area may be provided compared to a surgical mask and an N95 respirator.

In select embodiments of the disclosed personal protective equipment face covering with inherently ionic materials, the personal protective equipment face covering may include at least two of the fabric materials, and at least two layers. Each layer of the at least two layers may include at least one of the at least two fabric materials. At least one of the at least two fabric materials may include an inherently positively charged ionic material. And at least one of the at least two fabric materials may include an inherently negatively charged ionic material. In possibly preferred select embodiments of the disclosed personal protective equipment face covering with inherently ionic materials, the at least two layers may include at least one layer of a polyester fabric being the inherently negatively charged ionic material, and at least one layer of a silk fabric for the inherently positively charged ionic material. As examples, and clearly not limited thereto, in possibly most preferred embodiments, the polyester fabric may be a polyester Crepe de Chine fabric, and the silk fabric may be a silk Georgette or silk Habotai fabric. In select embodiments, the at least two layers may include a first layer of the polyester fabric being a first inherently negatively charge ionic material, a second layer of the polyester fabric being a second inherently negatively charged ionic material, and a third layer of the silk fabric being a first inherently positively charged ionic material.

In select embodiments of the disclosed personal protective equipment face covering with inherently ionic materials, the personal protective equipment face covering may be designed and configured as a gaiter facemask including the three layers of the inherently ionic material. The gaiter facemask with the inherently ionic materials may include a sheet of the three layers of the inherently ionic material. The sheet may include a top elastic portion on a top of the sheet, and a bottom elastic portion on a bottom of the sheet. A first side and a second side of the sheet may be attached together to form a loop configured to go around a face area of a wearer. Wherein, when the gaiter facemask is inserted over the face area of the wearer, the top elastic portion may be configured to compress the top of the sheet around the face area of the wearer above a nose and around a top portion of a neck, and the bottom elastic portion may be configured to compress the bottom of the sheet around a bottom portion of the neck.

In select embodiments, the gaiter facemask with inherently ionic materials may further include a nose piece. The nose piece may be affixed between the three layers of the inherently ionic material along the top of the sheet. The nose piece may be configured to aid in positioning the top of the sheet above the nose of the wearer. In select embodiments, the nose piece may include a foam material. The foam material may include a first rounded protruding member on a first side of the foam material configured to rest on a first side of the nose, and a second rounded protruding member on a second side of the foam material configured to rest on a second side of the nose. Wherein, the nose piece may be configured to aid in positioning the top of the sheet above the nose of the wearer by placing the nose piece on top of the nose of the wearer with the first rounded protruding member on the first side of the nose and the second rounded protruding member on the second side of the nose, whereby the nose is compressed between the first rounded protruding member and the second rounded protruding member. In select embodiments, the nose piece may further include a first side member, a second side member, and a middle triangular member. The first side member may extend from the first rounded protrusion. The second side member may extend from the second rounded protrusion. The middle triangular member may extend angularly from the middle of the first rounded protruding member and the second rounded protruding member. Wherein, the combination of the first side member, the second side member, and the middle triangular member may be configured to provide a space between the sheet of the three layers of the inherently ionic material and the nose and a mouth of the wearer to aid in preventing a suction between the sheet of the three layers of the inherently ionic material and the nose or the mouth of the wearer.

In other select embodiments of the disclosed personal protective equipment face covering with inherently ionic materials, the personal protective equipment face covering may be designed and configured as a wrap facemask including the three layers of the inherently ionic material. In select embodiments, the wrap facemask with the inherently ionic materials may include a sheet of the three layers of the inherently ionic material. The sheet may include a top elastic portion on a top of the sheet, and a bottom elastic portion on a bottom of the sheet. A first side and a second side of the sheet are removably attached together to form a loop configured to removably go around a face area of a wearer. Wherein, when the wrap facemask is wrapped around the face area of the wearer and the first side is attached to the second side, the top elastic portion is configured to compress the top of the sheet around the face area of the wearer above a nose and around a top portion of a neck, and the bottom elastic portion is configured to compress the bottom of the sheet around a bottom portion of the neck.

In select embodiments, the wrap facemask with inherently ionic materials may further include a nose piece. The nose piece may be affixed between the three layers of the inherently ionic material along the top of the sheet. The nose piece may be configured to aid in positioning the top of the sheet above the nose of the wearer. In select embodiments, the nose piece may include a foam material. The foam material may include a first rounded protruding member on a first side of the foam material configured to rest on a first side of the nose, and a second rounded protruding member on a second side of the foam material configured to rest on a second side of the nose. Wherein, the nose piece may be configured to aid in positioning the top of the sheet above the nose of the wearer by placing the nose piece on top of the nose of the wearer with the first rounded protruding member on the first side of the nose and the second rounded protruding member on the second side of the nose, whereby the nose is compressed between the first rounded protruding member and the second rounded protruding member. In select embodiments, the nose piece may further include a first side member, a second side member, and a middle triangular member. The first side member may extend from the first rounded protrusion. The second side member may extend from the second rounded protrusion. The middle triangular member may extend angularly from the middle of the first rounded protruding member and the second rounded protruding member. Wherein, the combination of the first side member, the second side member, and the middle triangular member may be configured to provide a space between the sheet of the three layers of the inherently ionic material and the nose and a mouth of the wearer to aid in preventing a suction between the sheet of the three layers of the inherently ionic material and the nose or the mouth of the wearer.

In select embodiments of the disclosed personal protective equipment face covering with inherently ionic materials, the personal protective equipment face covering may be designed and configured as a scarf facemask including the three layers of the inherently ionic material. In select embodiments, the scarf facemask with the inherently ionic materials may include a middle patch section, a first decorative side section, and a second decorative side section. The middle patch section may include the three layers of the inherently ionic material. The middle patch section may include a top elastic portion on a top of the middle patch section, and a bottom elastic portion on a bottom of the middle patch section. The first decorative side section may be attached to a first side of the middle patch section. The second decorative side section may be attached to a second side of the middle patch section. Wherein, when the scarf facemask is wrapped around the face area of the wearer with the middle patch section positioned over the face area, the top elastic portion and the bottom elastic portion may be configured for maintaining the middle patch over the face area of the wearer.

In another aspect, the instant disclosure embraces the personal protective equipment face covering with the inherently ionic materials in any embodiment and/or combination of embodiments shown and/or described herein.

In another aspect, the instant disclosure embraces a method of making a personal protective equipment face covering with inherently ionic materials in any embodiment and/or combination of embodiments shown and/or described herein. In general, the disclosed method may of making a personal protective equipment face covering with inherently ionic materials may include the steps of: providing at least two fabric materials of inherently charged ionic materials, wherein at least one of the at least two fabric materials including an inherently positively charged ionic material, and at least one of the at least two fabric materials including an inherently negatively charged ionic material; and sewing each of the at least two fabric materials of the inherently charged ionic materials together to create the personal protective equipment face covering.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 12A shows a diagram of the first step of assembling the gaiter facemask of FIG. 3 with inherently ionic material and a nose piece according to select embodiments of the instant disclosure where the layers are aligned;

FIG. 12E shows a diagram of the fifth step of assembling the gaiter facemask with inherently ionic material and a nose piece of FIG. 3 where the garment is pulled inside out while holding the nose piece in place;

FIG. 12F shows a diagram of the sixth step of assembling the gaiter facemask with inherently ionic material and a nose piece of FIG. 3 where stitching is made down the edges of the nose piece to hold the nose piece in place and stitching is made below the edge of the nose piece to allow the foam nose piece to move when bent;

FIG. 12H shows a diagram of the eighth step of assembling the gaiter facemask with inherently ionic material and a nose piece of FIG. 3 where the knitted elastic is pulled through the channel between the bottom layer of polyester and middle layer of silk, and then stitching is made down the edge of the elastic from the end of the nose piece;

FIG. 12J shows a diagram of the tenth step of assembling the gaiter facemask with inherently ionic material and a nose piece of FIG. 3 where the garment is first turned over so that the garment is facing up, then the elastic is stretch stitched down ¼ inch up from bottom along left edge, then the top of the elastic is stretch stitched down while keeping constant stretch on the elastic, then the elastic is stretch stitched down ¼ inch up from bottom along right edge, then the bottom of the elastic is stretch stitched down while keeping constant stretch on elastic, and finally excess elastic is trimmed off;

Figure 1:
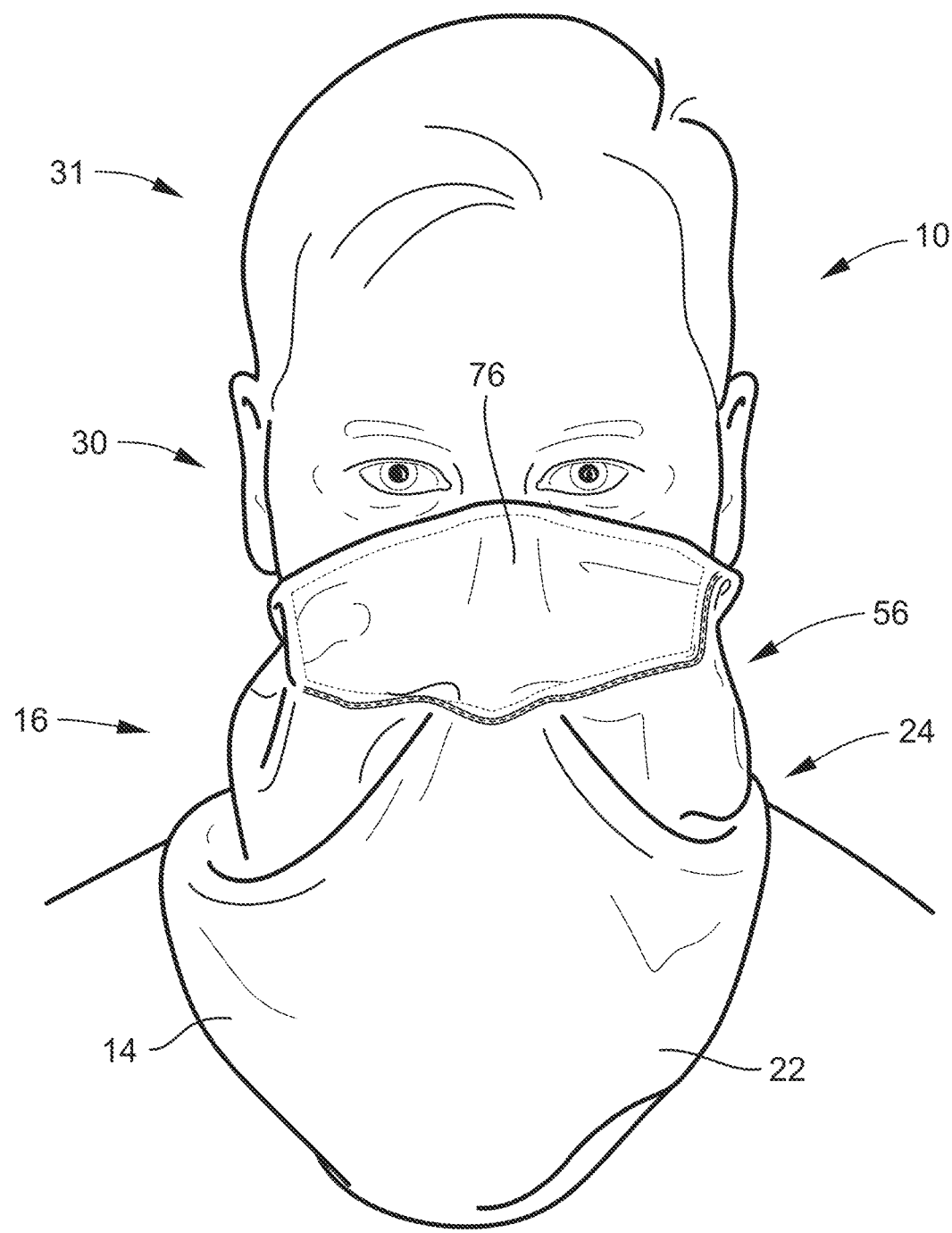
FIG. 1 is a front perspective environmental view of a gaiter facemask with inherently ionic material according to select embodiments of the instant disclosure being worn by a user.
Figure 2:
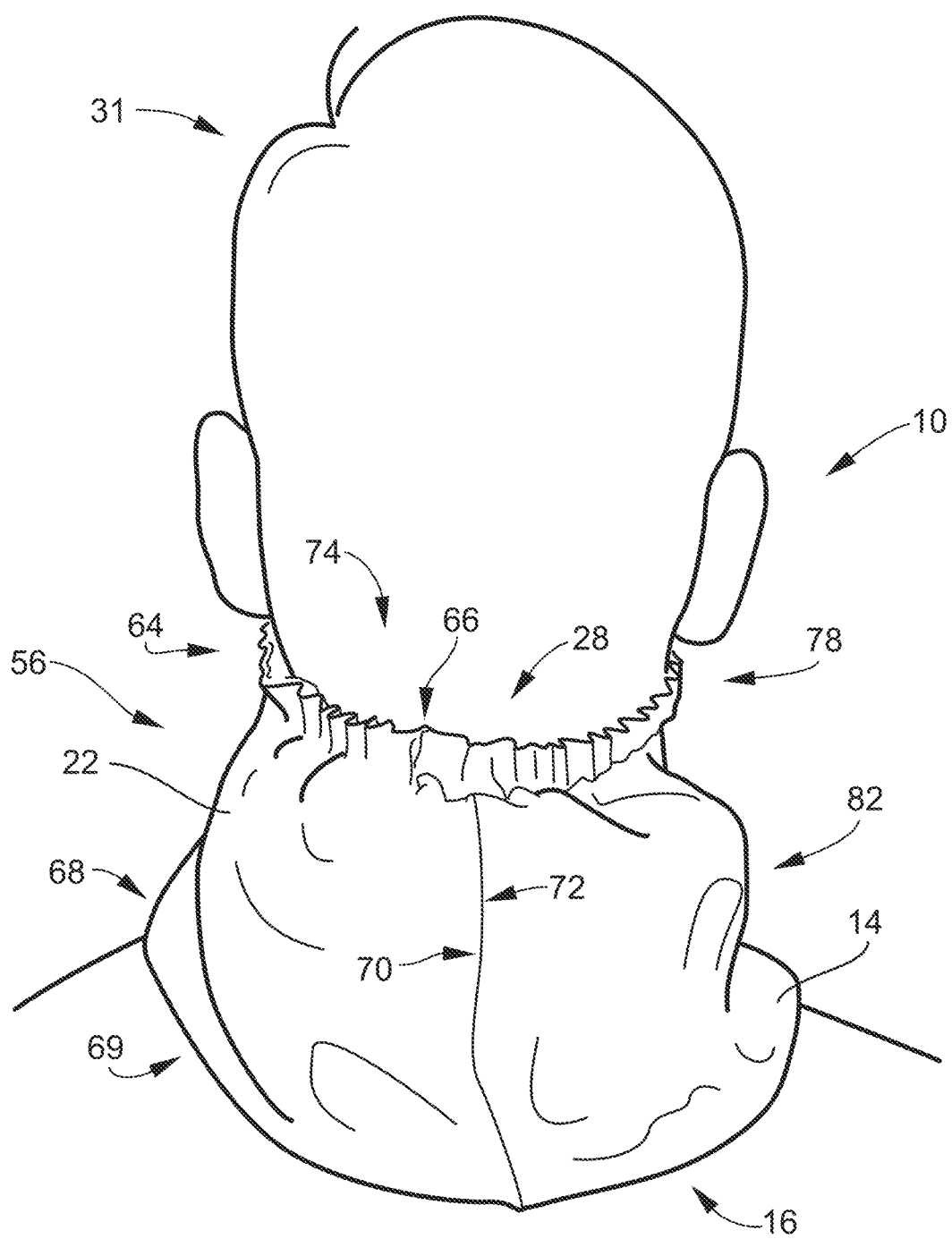
FIG. 2 is a rear perspective environmental view of the gaiter facemask of FIG. 1 being worn by the user.
Figure 3:
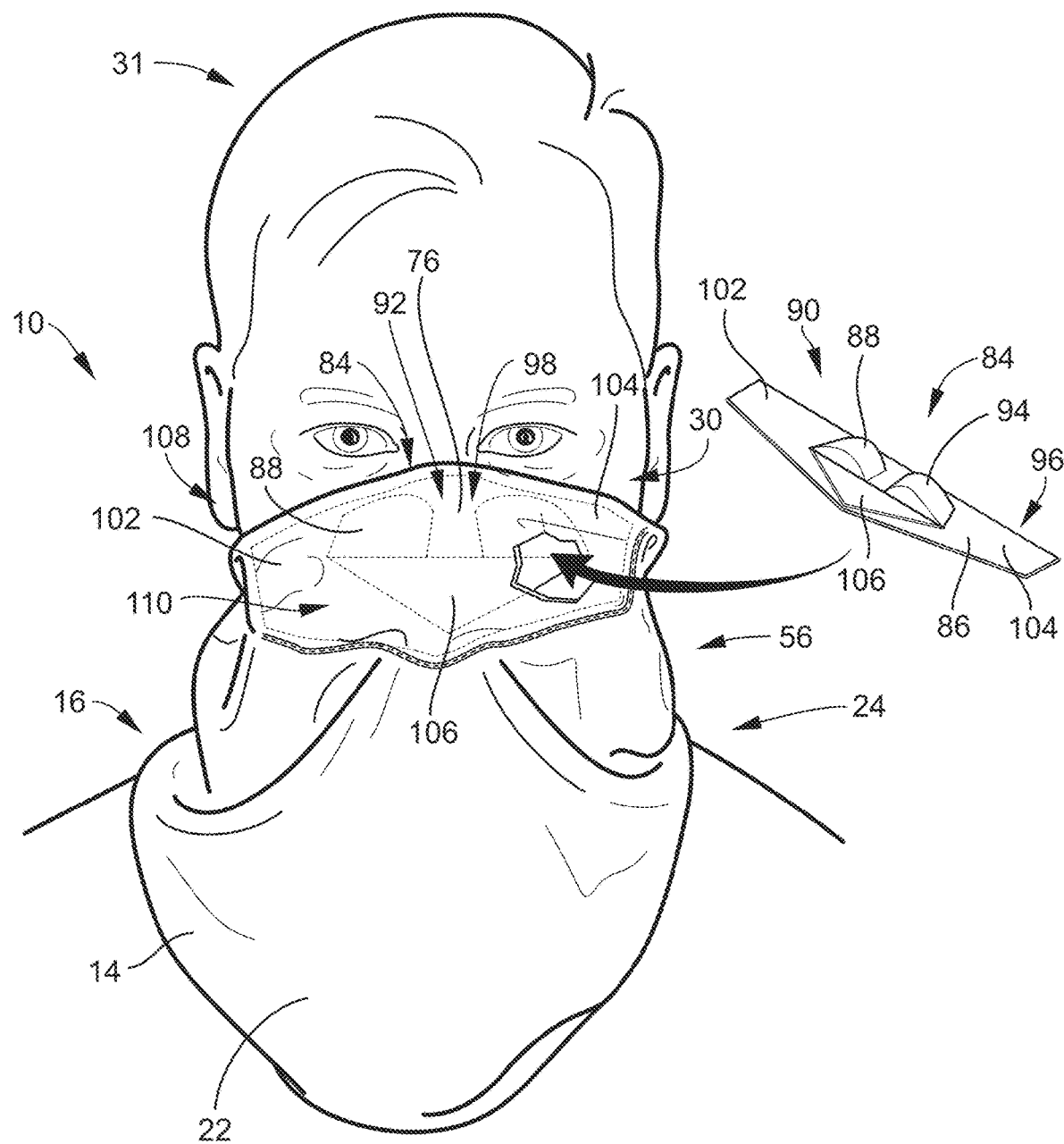
FIG. 3 is a front perspective environmental view of a gaiter facemask with inherently ionic material and a nose piece according to select embodiments of the instant disclosure being worn by a user.
Figure 4A:
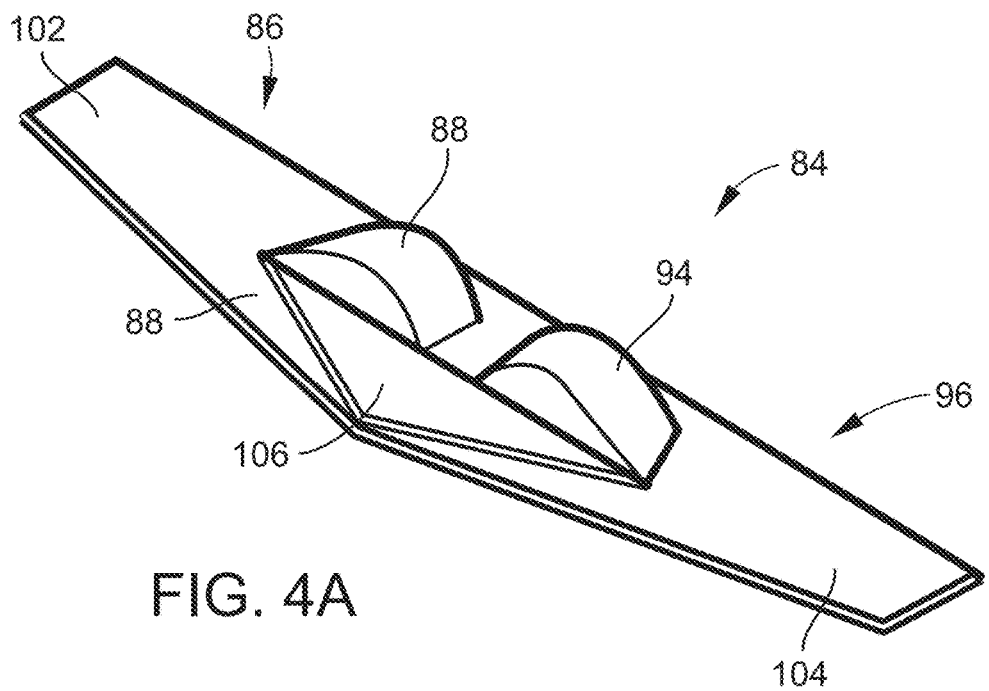
FIG. 4A is a top perspective view of the nose piece according to select embodiments of the instant disclosure for the gaiter facemask of the instant disclosure.
Figure 4B:
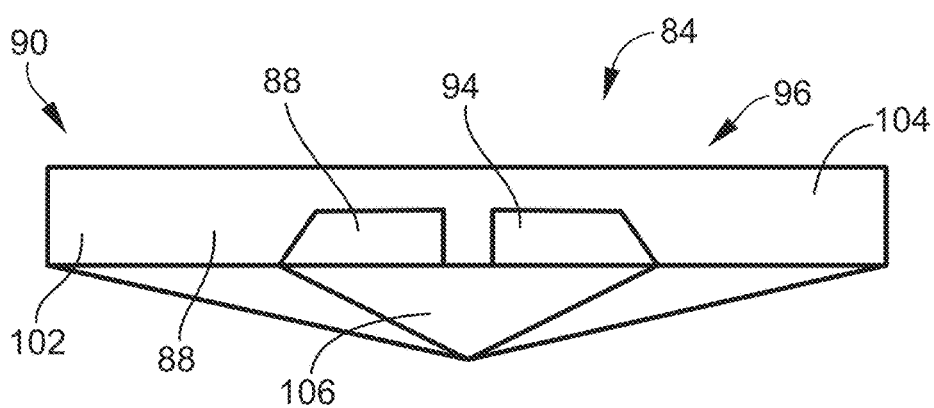
FIG. 4B is a top view of the nose piece of FIG. 4A.
Figures 4C, 4D:
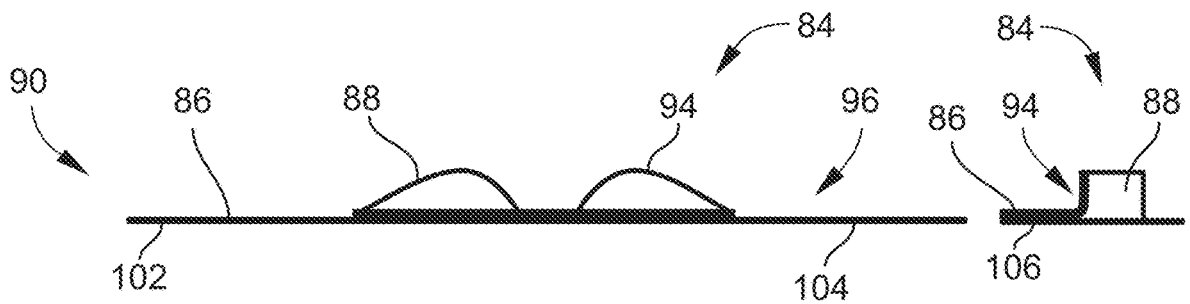
FIG. 4C is a front or rear view of the nose piece of FIG. 4A.
FIG. 4D is a side view of the nose piece of FIG. 4A.
Figure 5:
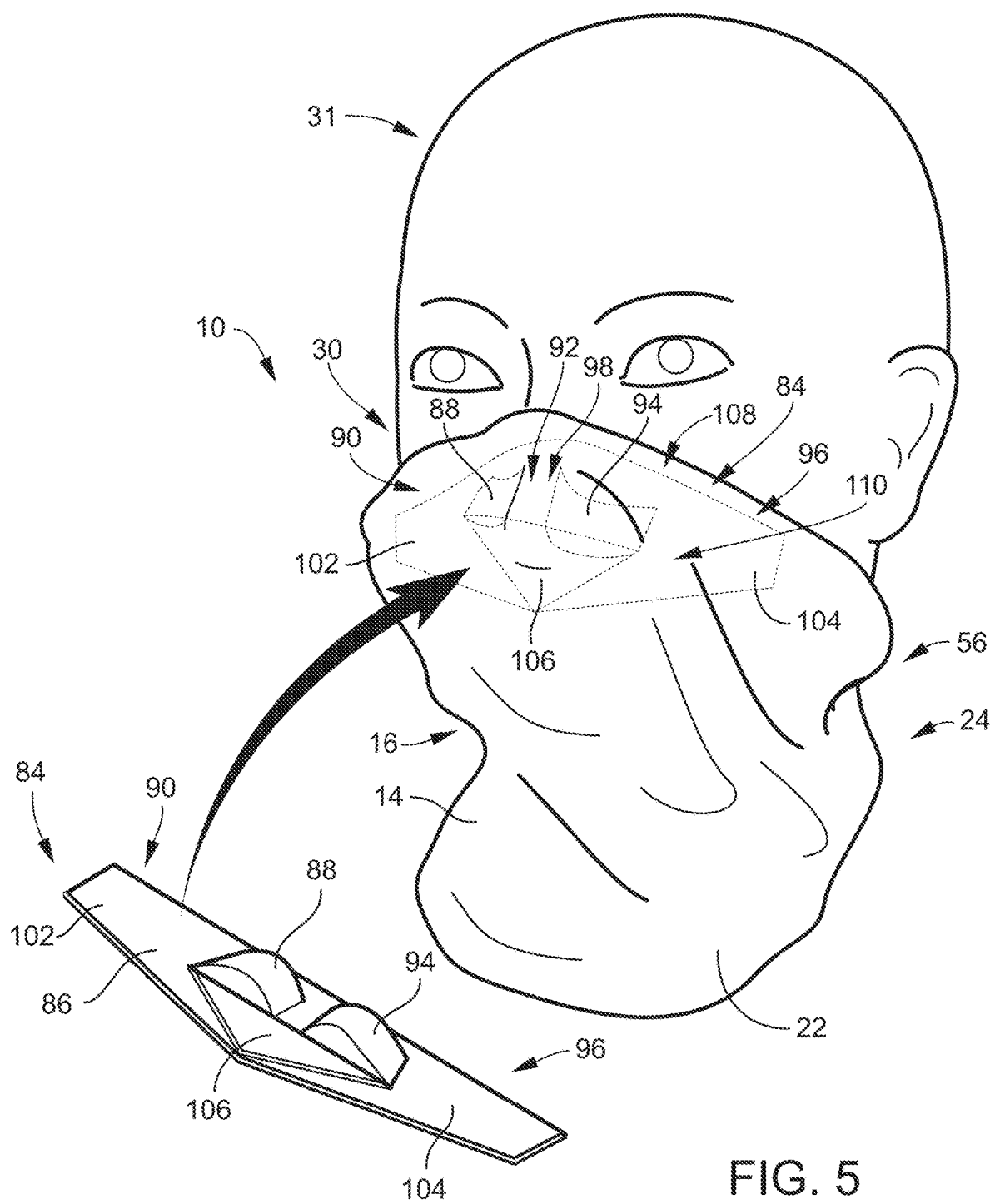
FIG. 5 is a front perspective environmental view of a gaiter facemask with inherently ionic material and a nose piece according to select embodiments of the instant disclosure being worn by a user.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-13, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure may solve the aforementioned limitations of the currently available PPE devices, by providing PPE face covering 10 with inherently ionic material 16, like gaiter facemask 56 (see FIGS. 1-5, 7, 12 and 13), wrap facemask or face covering 58 (see FIGS. 9, 10, 12 and 13), or scarf facemask or face covering 60 (see FIGS. 6, 7, and 11), all with inherently ionic material 16. As such, personal protective equipment face covering 10 may generally include at least one layer 12. Each of the at least one layers 12 may include at least one fabric material 14. Wherein, each of the at least one layer 12 of the at least one fabric material 14 may include inherently ionic material 16.

One feature of personal protective equipment face covering 10 may be that ionic charge 18 on inherently ionic material 16 may come from molecular structure 20 of such fabric material 14 used in personal protective equipment face covering 10. Accordingly, ionic charge 18 on inherently ionic material 16 may not be from electrostatic charge or triboelectricity.

Another feature of personal protective equipment face covering 10 may be that each of the at least one fabric materials 14 may comprise open weave fabrics 22. These open weave fabrics 22 may be configured to allow unrestricted airflow 24 for inhalation and exhalation. Whereby, personal protective equipment face covering 10 with inherently ionic materials 16 may be configured to allow less air to escape around a periphery of personal protective equipment face covering 10 compared to a conventional PPE mask. See test results in the Examples below. In select embodiments, personal protective equipment face covering 10 may be configured to encircle neck 28 and face area 30 of wearer 31, thereby protecting a greater area of skin compared to a conventional PPE mask. See FIGS. 1-3 and 5-8. Accordingly, a greater filtration surface area may be provided compared to a surgical mask and an N95 respirator. See test results in the Examples below.

As best shown in FIGS. 12, in select possibly preferred embodiments, personal protective equipment face covering 10 may include at least two of the fabric materials 14, and at least two layers 12. Each layer 12 of the at least two layers 12 may include at least one of the at least two fabric materials 14. At least one of the at least two fabric materials 14 may include an inherently positively charged ionic material 32. And at least one of the at least two fabric materials 14 may include an inherently negatively charged ionic material 34. In possibly most preferred select embodiments of personal protective equipment face covering 10 with inherently ionic materials, the at least two layers 12 may include at least one layer 12 of polyester fabric 36 being inherently negatively charged ionic material 32, and at least one layer 12 of silk fabric 38 for inherently positively charged ionic material 34. As examples, and clearly not limited thereto, in possibly most preferred embodiments, polyester fabric 36 may be polyester Crepe de Chine fabric 40, and silk fabric 38 may be silk Georgette or silk Habotai fabric 42. As best shown in FIGS. 12A and 12E, in select embodiments, the at least two layers 12 may include first layer 44 of polyester fabric 36 being first inherently negatively charge ionic material 46, second layer 48 of polyester fabric 36 being second inherently negatively charged ionic material 50, and third layer 52 of silk fabric 38 being first inherently positively charged ionic material 54.

Referring now specifically to FIGS. 1-5, 7, 12 and 13, in select embodiments of personal protective equipment face covering 10 with inherently ionic materials 16, personal protective equipment face covering 10 may be designed and configured as gaiter facemask 56. Gaiter facemask 56 may include, but is not limited to, the three layers (44, 48 and 52) of inherently ionic material 16. Gaiter facemask 56 with inherently ionic materials 16 may include sheet 62 of the three layers (44, 48 and 52) of the inherently ionic material 16. Sheet 62 may include top elastic portion 64 on top 66 of sheet 62, and bottom elastic portion 68 on bottom 69 of sheet 62. For gaiter facemask 56, first side 70 and second side 72 of sheet 62 may be attached together to form loop 74 configured to go around face area 30 of wearer 31, similar to a standard gaiter facemask Wherein, when gaiter facemask 56 is inserted over face area 30 of wearer 31, top elastic portion 64 may be configured to compress top 66 of sheet 62 around face area 30 of wearer 31 above nose 76 and around top portion 78 of neck 28. In addition, when gaiter facemask 56 is inserted over face area 30 of wearer 31, bottom elastic portion 68 may be configured to compress bottom 69 of sheet 62 around bottom portion 82 of neck 28. Whereby, the combination of top elastic portion 64 on top 66 of sheet 62, and bottom elastic portion 68 on bottom 69 of sheet 62, may allow for gaiter facemask 56 to be closed around face area 30 forcing all or most air inhaled and exhaled to move through layers 12 of inherently ionic material 16.

Figure 9:
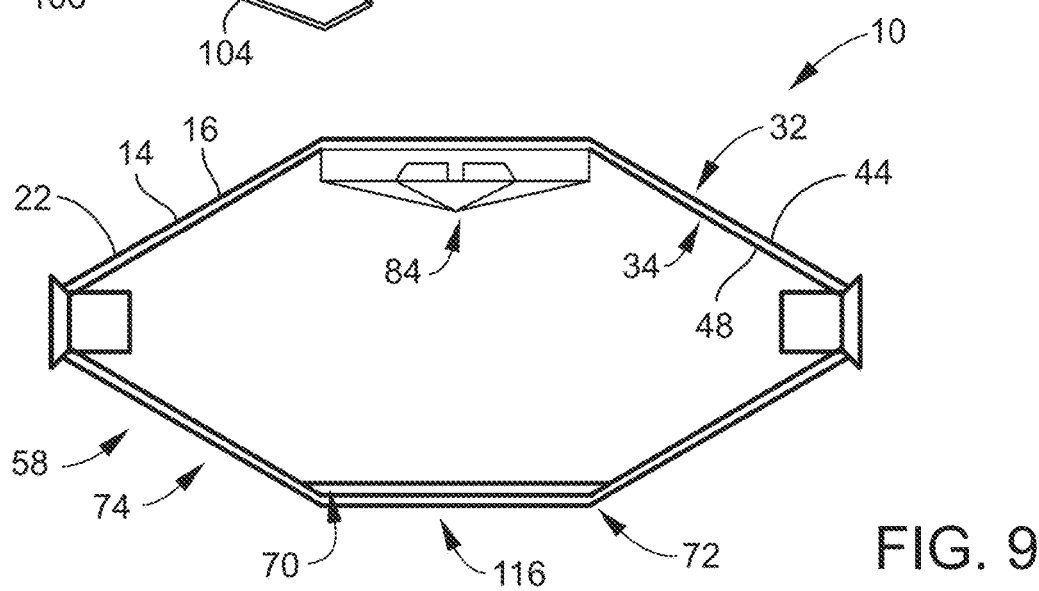
FIG. 9 is a top view of a pattern for the wrap with inherently ionic material and a nose piece of FIG. 8.
Figure 10:
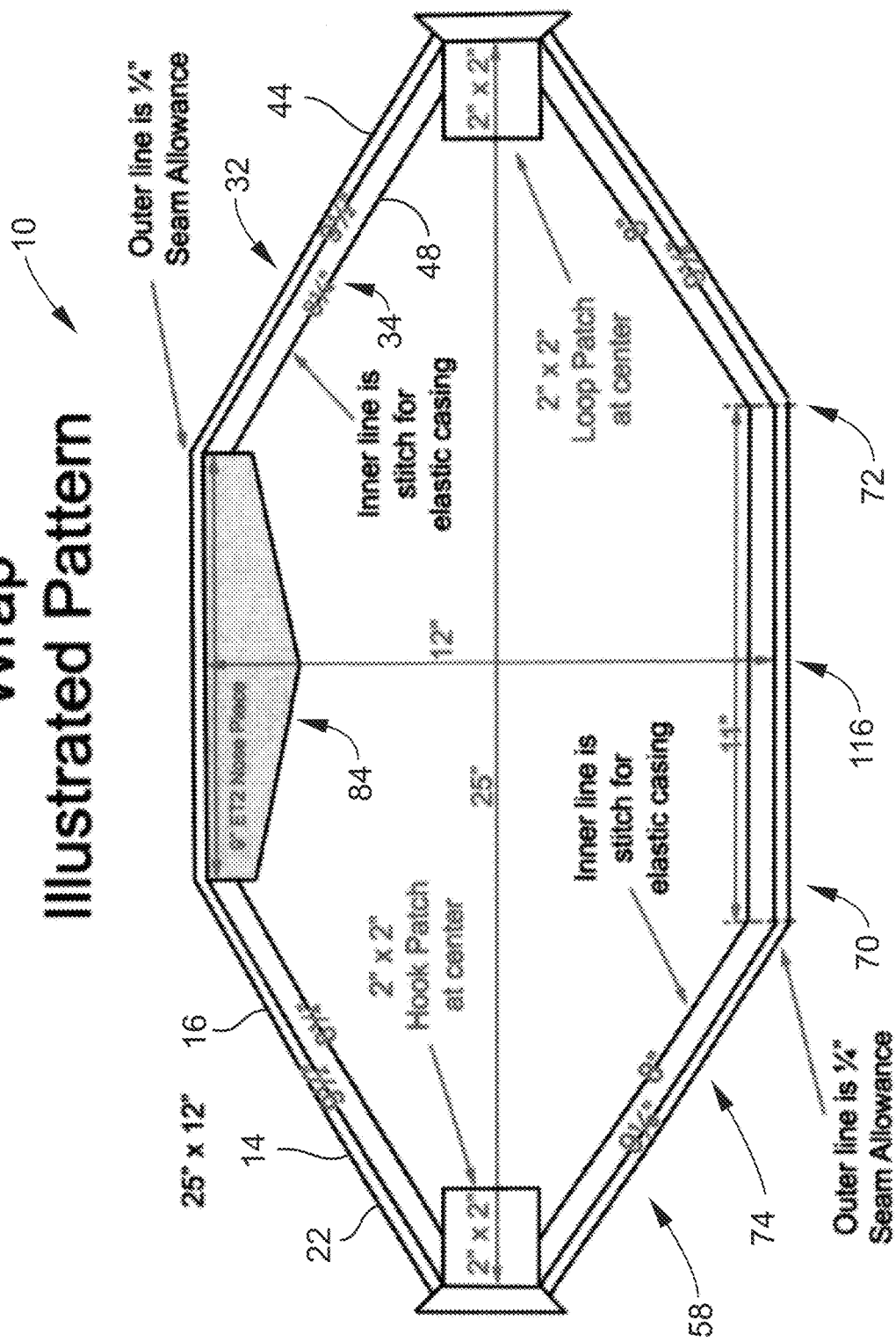
FIG. 10 is a top view of a pattern for the wrap with inherently ionic material and a nose piece according to select embodiments of the instant disclosure with example dimensions shown.

Referring now specifically to FIGS. 9, 10, 12 and 13, in other select embodiments of personal protective equipment face covering 10 with inherently ionic materials 16, personal protective equipment face covering 10 may be designed and configured as wrap facemask 58. Wrap facemask 58 may include, but is not limited to, the three layers (44, 48 and 52) of the inherently ionic material 16. In select embodiments, wrap facemask 58 with inherently ionic materials 16 may include sheet 62 of the three layers (44, 48 and 52) of inherently ionic material 16, similar to gaiter facemask 56 discussed above. Sheet 62 may include top elastic portion 64 on top 66 of sheet 62, and bottom elastic portion 68 on bottom 69 of sheet 62. As best shown in FIGS. 9 and 10, for wrap facemask 58, first side 70 and second side 72 of sheet 62 may be removably attached together to form loop 74 configured to removably go around face area 30 of wearer 31. As such, wrap facemask 58 may include removable attachment 116 on first side 70 and second side 72 of sheet 62 for removably attaching the wrap around wearer 31. In select possibly preferred embodiments, removable attachment 116 on first side 70 and second side 72 may be a hook and loop type fastener configured for removably attaching first side 70 to second side 72 of sheet 62. Wherein, when wrap facemask 58 is wrapped around face area 30 of wearer 31 and first side 70 is attached to second side 72, top elastic portion 64 may be configured to compress top 66 of sheet 62 around face area 30 of wearer 31 above nose 76 and around top portion 78 of neck 28, and bottom elastic portion 68 may be configured to compress bottom 69 of sheet 62 around bottom portion 82 of neck 28. Whereby, the combination of top elastic portion 64 on top 66 of sheet 62, and bottom elastic portion 68 on bottom 69 of sheet 62, may allow for wrap facemask 58 to be closed around face area 30 forcing all or most air inhaled and exhaled to move through layers 12 of inherently ionic material 16.

Referring now specifically to FIGS. 3-5, 7-10, 12 and 13, in select embodiments, gaiter facemask 56 and/or wrap facemask 58 with inherently ionic materials 16 may further optionally include nose piece 84. Nose piece 84 may be affixed between the three layers (44, 48 and 52) of inherently ionic material 16 along top 66 of sheet 62. Nose piece 84 may be configured to aid in positioning top 66 of sheet 62 above nose 76 of wearer 31. In select embodiments, nose piece 84 may include foam material 86. Foam material 86 may include first rounded protruding member 88 on first side 90 of foam material 86 configured to rest on first side 92 of nose 76. Second rounded protruding member 94 may be on second side 96 of foam material 86 configured to rest on second side 98 of nose 76. Wherein, nose piece 84 may be configured to aid in positioning top 66 of sheet 62 above nose 76 of wearer 31 by placing nose piece 84 on top of nose 76 of wearer 31 with first rounded protruding member 88 on first side 92 of nose 76 and second rounded protruding member 94 on second side 98 of nose 76. Whereby, nose 76 of wearer 31 may be compressed between first rounded protruding member 88 and second rounded protruding member 94. In select embodiments, nose piece 84 may further include first side member 102, second side member 104, and middle triangular member 106. First side member 102 may extend from first rounded protruding member 88. Second side member 104 may extend from second rounded protruding member 94. Middle triangular member 106 may extend angularly from the middle of first rounded protruding member 88 and second rounded protruding member 94. Wherein, combination 108 of first side member 102, second side member 104, and middle triangular member 106 may be configured to provide space 110 between sheet 62 of the three layers (44, 48 and 52) of inherently ionic material 16 and nose 76 and mouth 112 of wearer 31 to aid in preventing a suction between sheet 62 of the three layers (44, 48 and 52) of the inherently ionic material 16 and nose 76 or mouth 112 of wearer 31.

Figure 6:
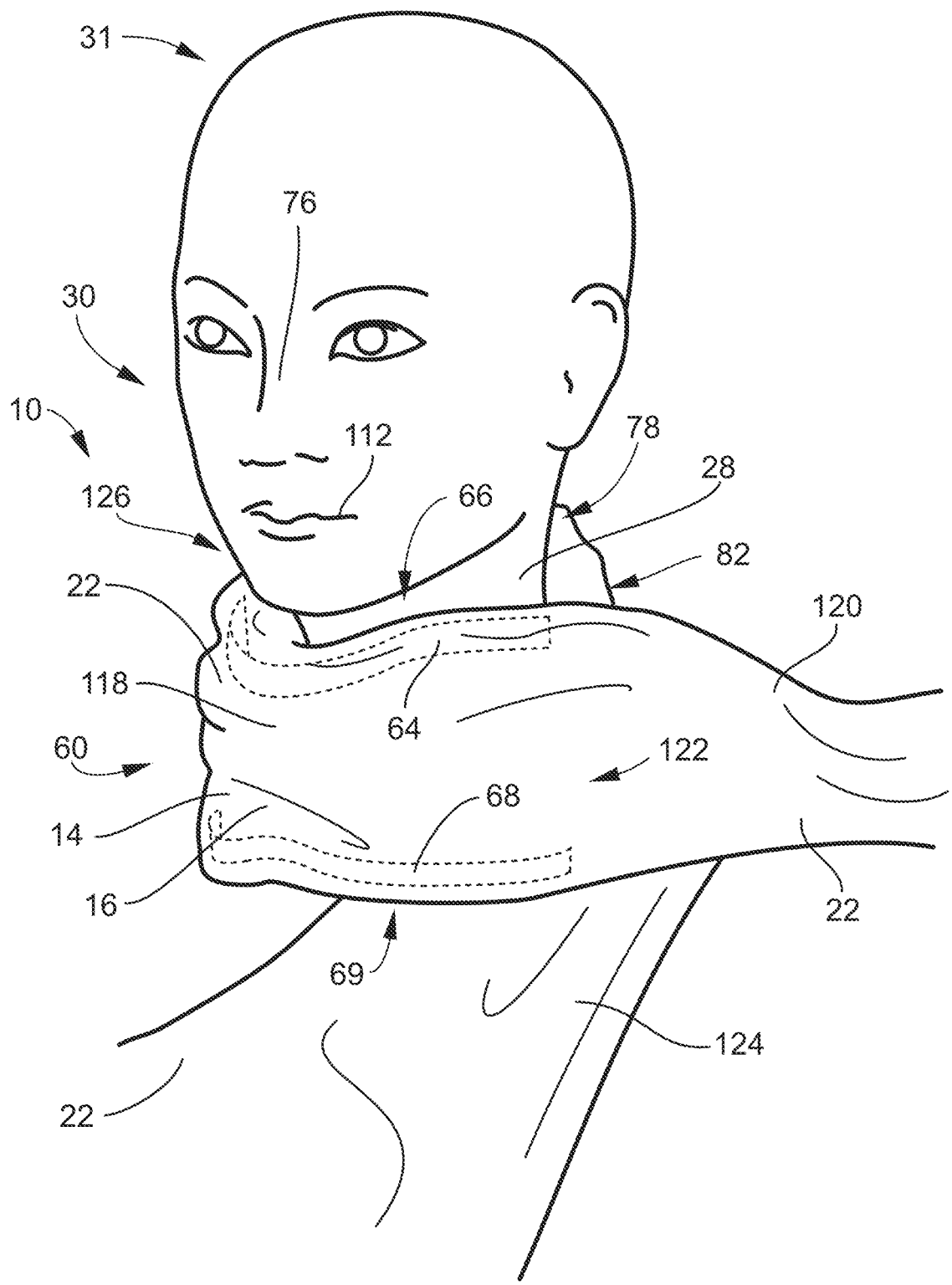
FIG. 6 is a front perspective environmental view of a scarf facemask with inherently ionic material and elastic according to select embodiments of the instant disclosure being worn around the neck of a user.
Figure 7:
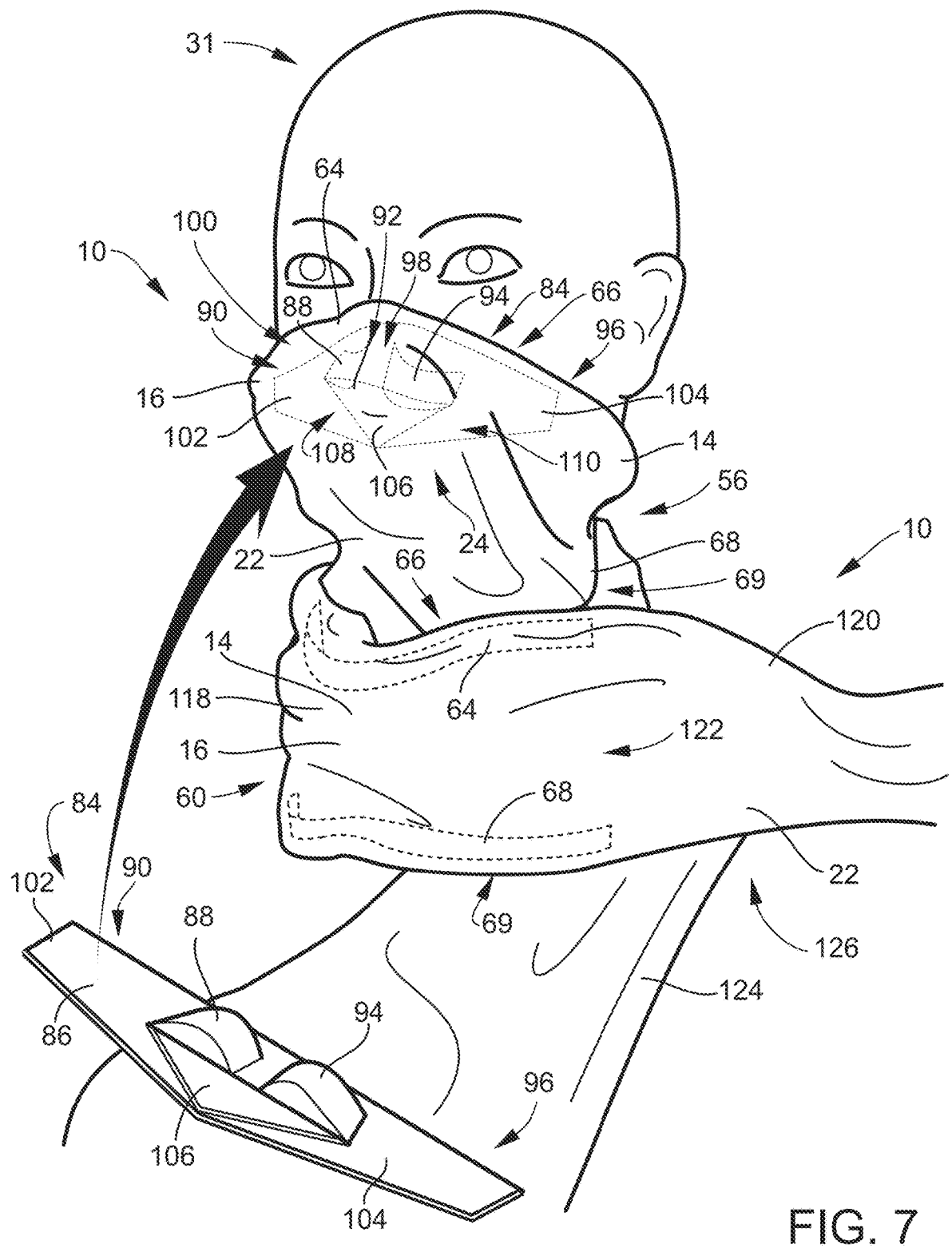
FIG. 7 is a front perspective environmental view of a gaiter facemask with inherently ionic material and a nose piece according to select embodiments of the instant disclosure being worn by a user and a scarf facemask with inherently ionic material and elastic according to select embodiments of the instant disclosure being worn around the neck of the user.
Figure 8:
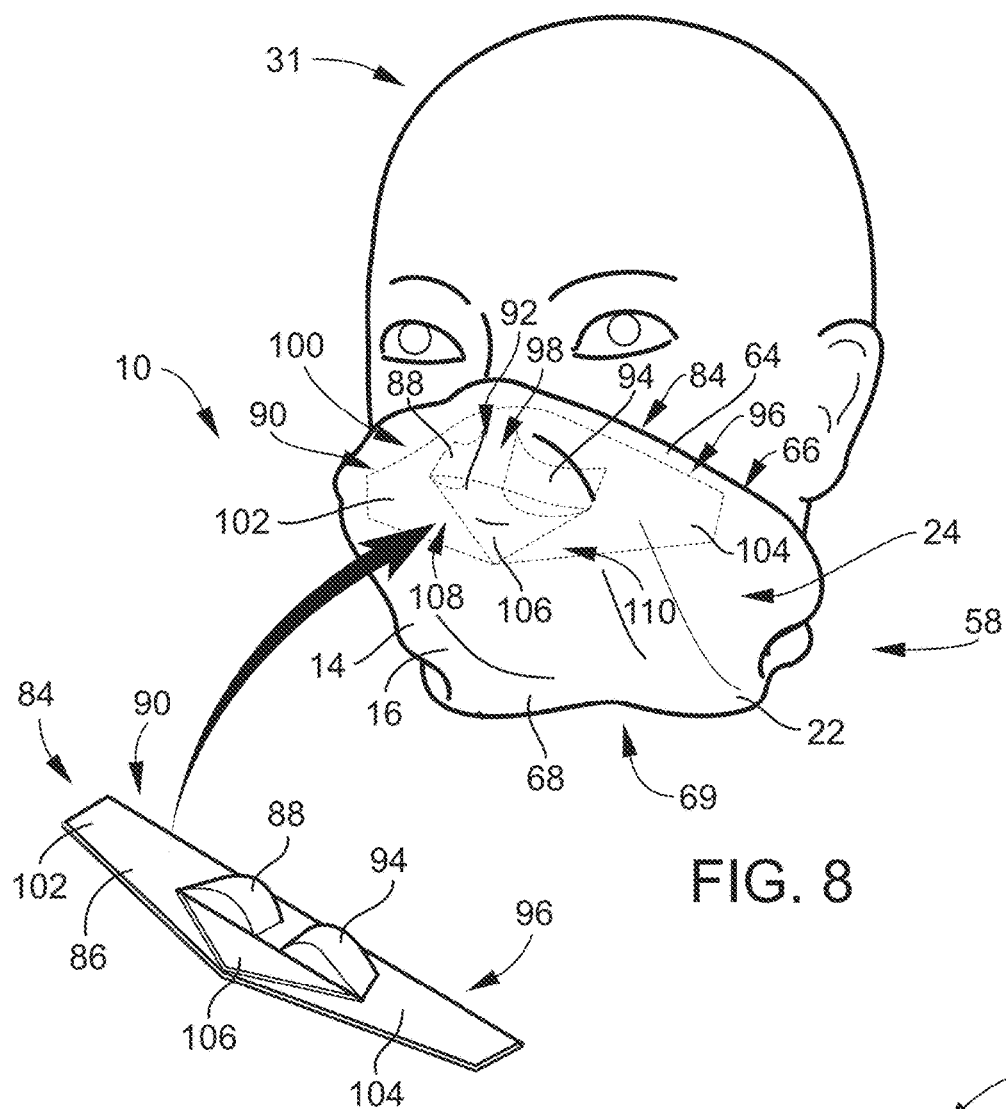
FIG. 8 is a front perspective environmental view of a gaiter facemask with inherently ionic material and a nose piece according to select embodiments of the instant disclosure being worn by a user.
Figure 11A:
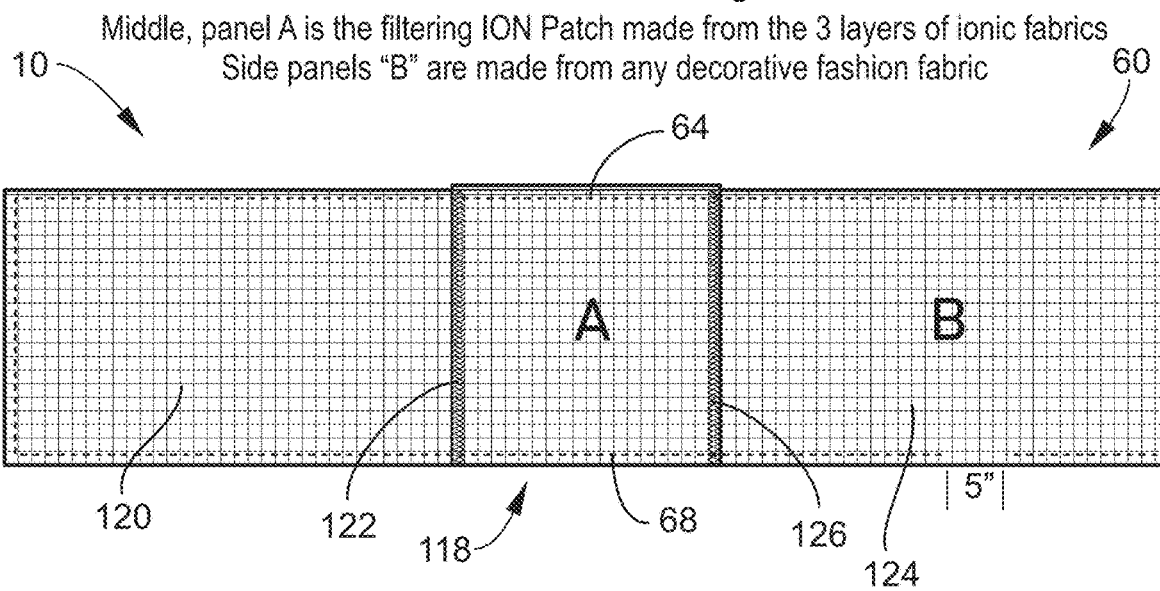
FIG. 11A is a top view of a pattern for a scarf facemask with inherently ionic material according to select embodiments of the instant disclosure showing the middle panel A mad from a filtering ion patch and the side panels B made from any decorative fashion fabric.
Figure 11B:
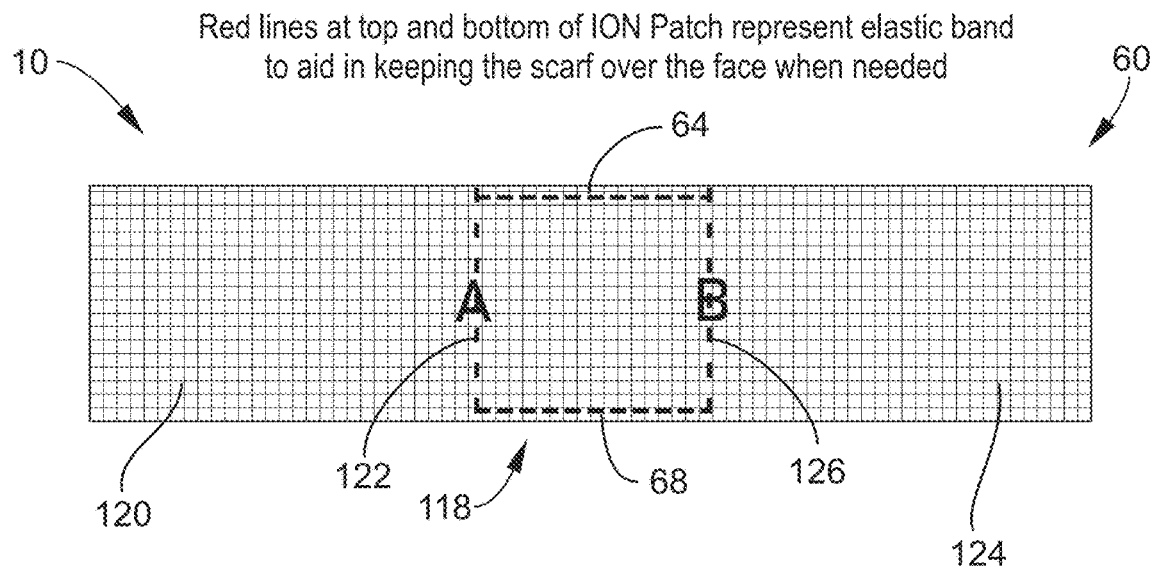
FIG. 11B is a bottom view of the pattern for a scarf facemask of FIG. 11A showing the elastic band at the top and bottom of the filtering ion patch configured to aid in keeping the scarf over the face when needed.
Figure 12B:
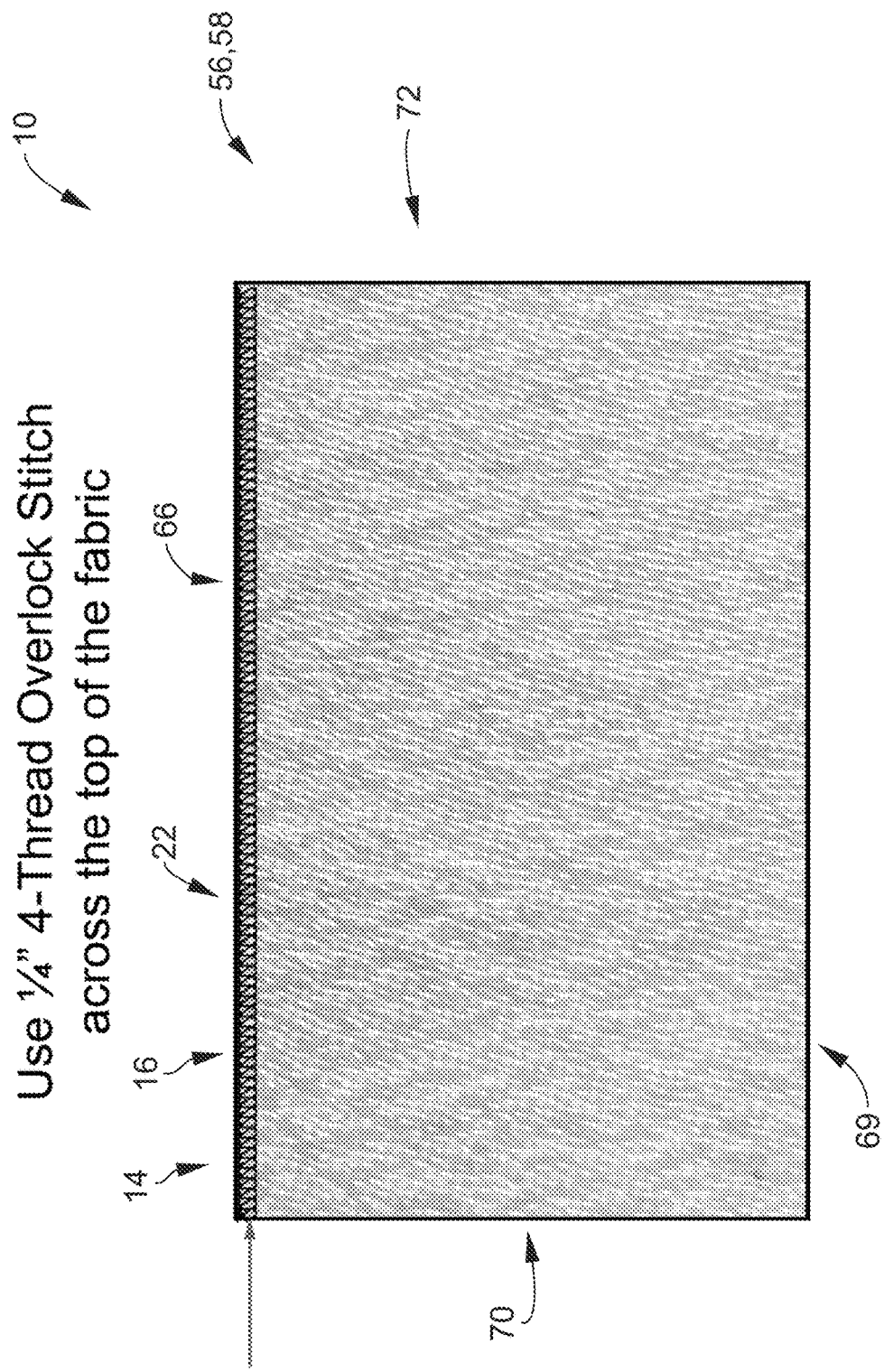
FIG. 12B shows a diagram of the second step of assembling the gaiter facemask with inherently ionic material and a nose piece of FIG. 3 where a thread overlock stitch is made across the top of the fabric, like ¼ inch 4-thread overlock stich.
Figure 12C:
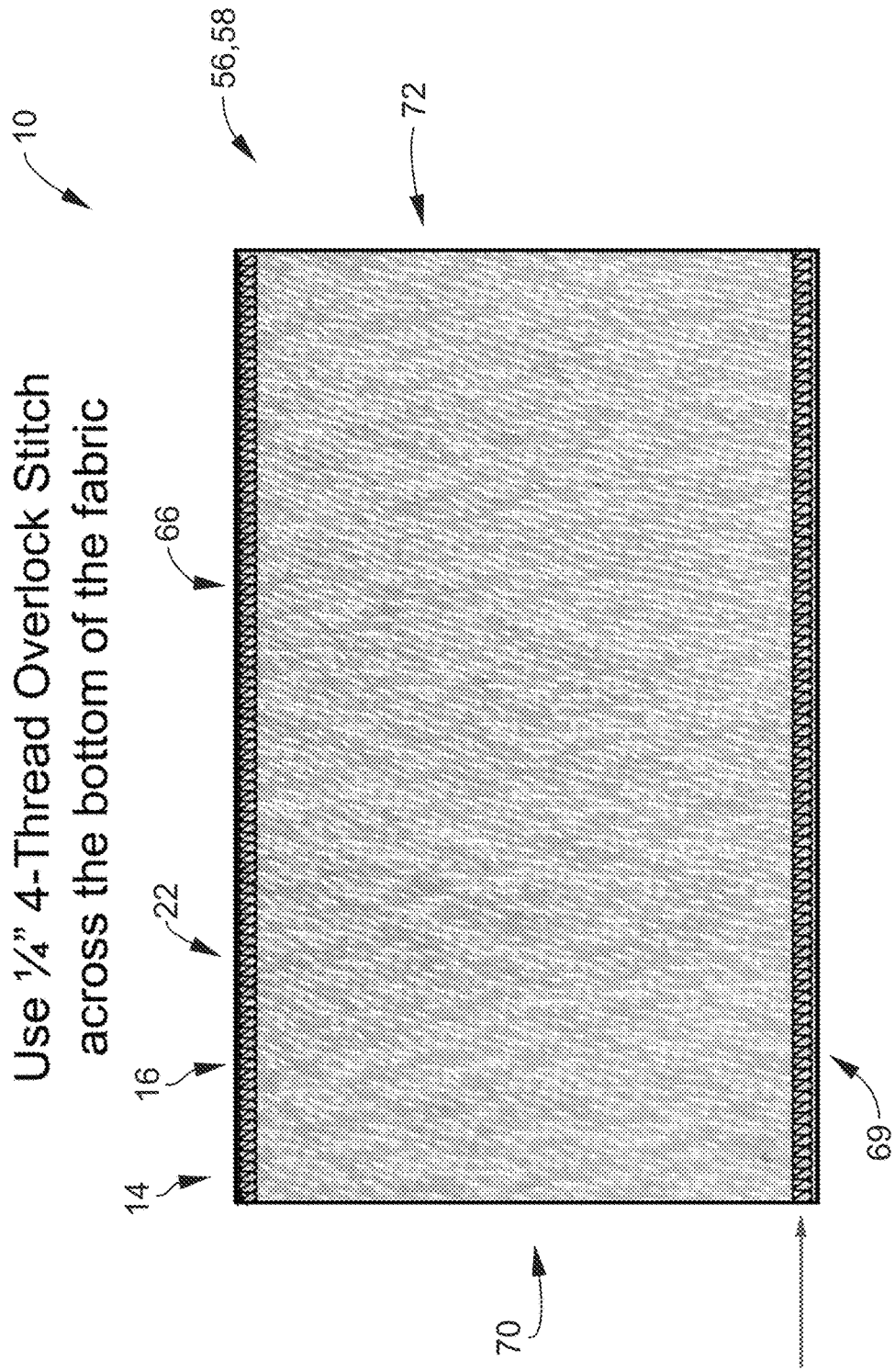
FIG. 12C shows a diagram of the third step of assembling the gaiter facemask with inherently ionic material and a nose piece of FIG. 3 where a thread overlock stitch is made across the bottom of the fabric, like ¼ inch 4-thread overlock stich.
Figure 12D:
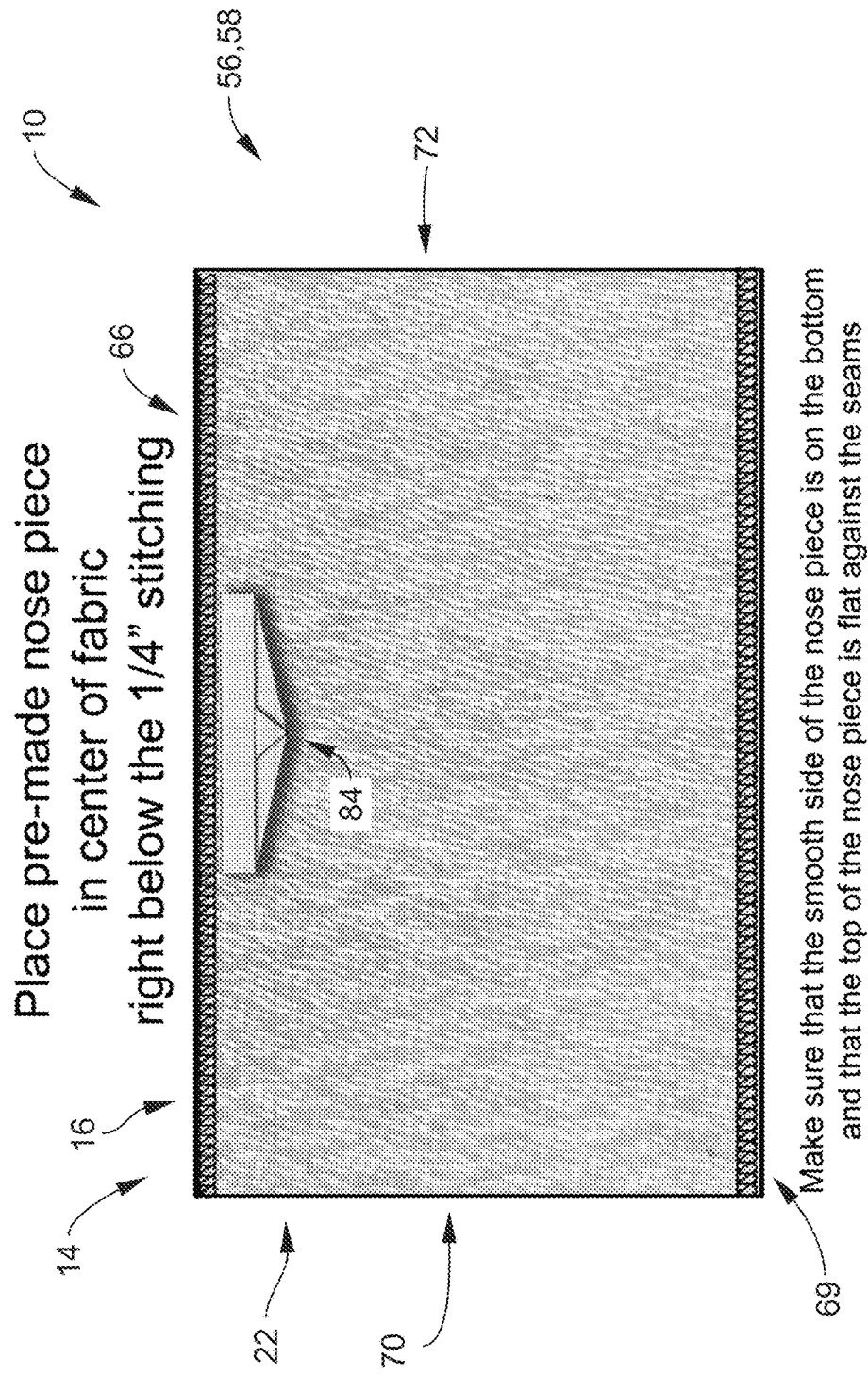
FIG. 12D shows a diagram of the fourth step of assembling the gaiter facemask with inherently ionic material and a nose piece of FIG. 3 where the nose piece is positioned in the center of the fabric right below the thread overlock stitching made across the top of the fabric.
Figure 12G:
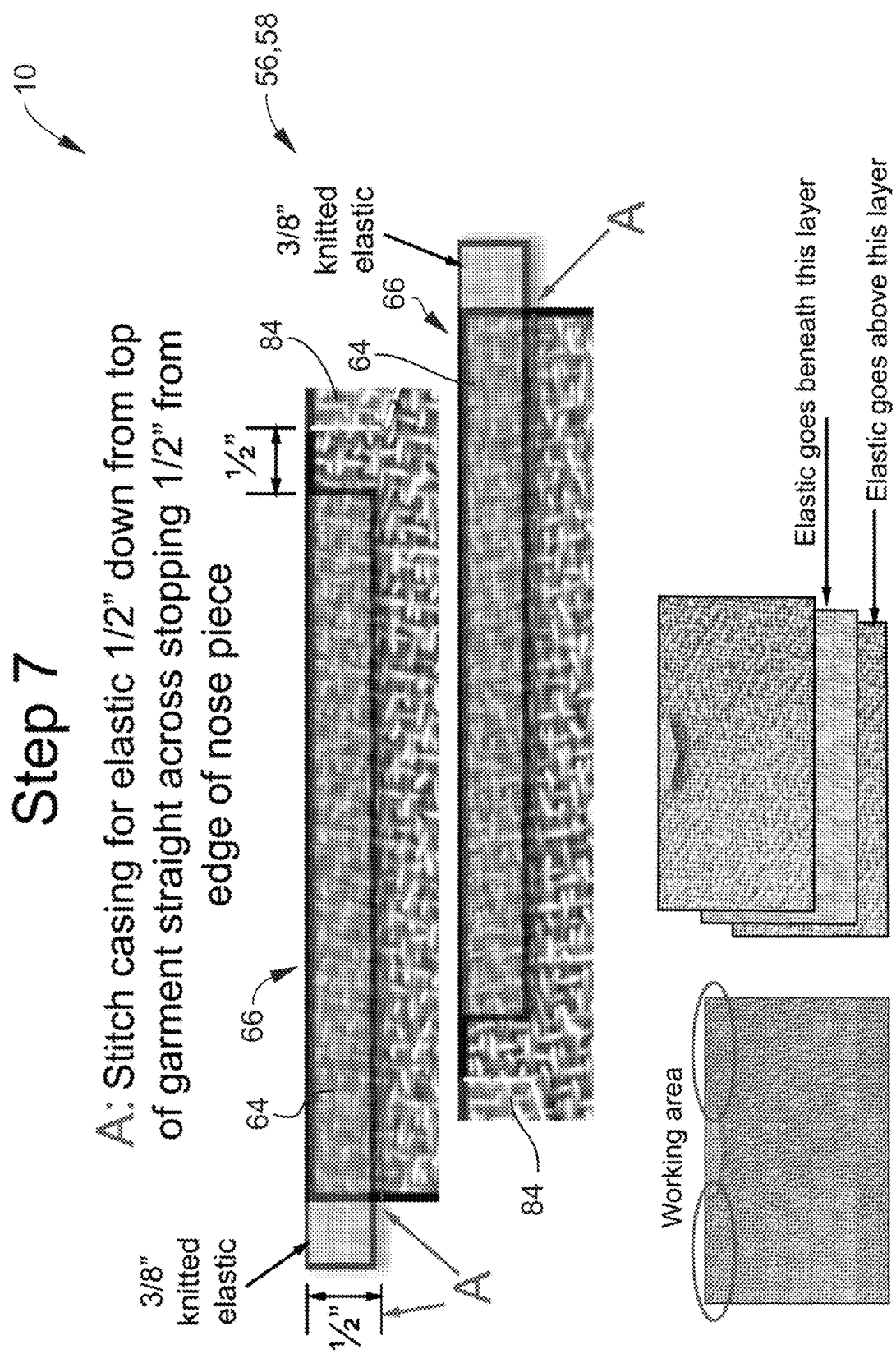
FIG. 12G shows a diagram of the seventh step of assembling the gaiter facemask with inherently ionic material and a nose piece of FIG. 3 where stitch casing is made for elastic, like ½ inch down from top of garment straight across stopping ½ inch from edge of nose piece.
Figure 12I:
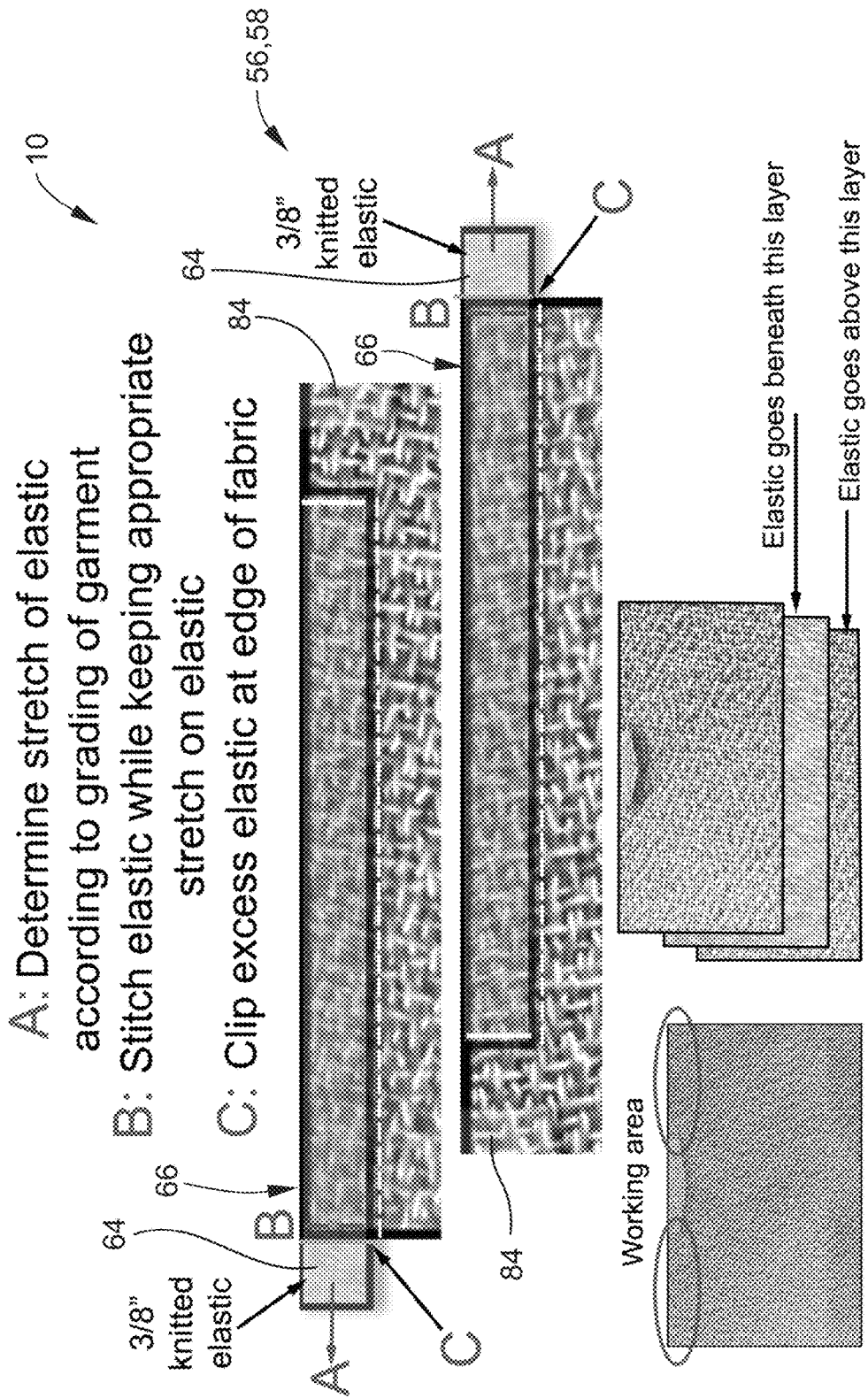
FIG. 12I shows a diagram of the ninth step of assembling the gaiter facemask with inherently ionic material and a nose piece of FIG. 3 where, after the stretch of the elastic is determined, the elastic is stitched while keeping appropriate stretch on elastic, and excess elastic at the edge of the fabric is clipped.
Figure 12K:
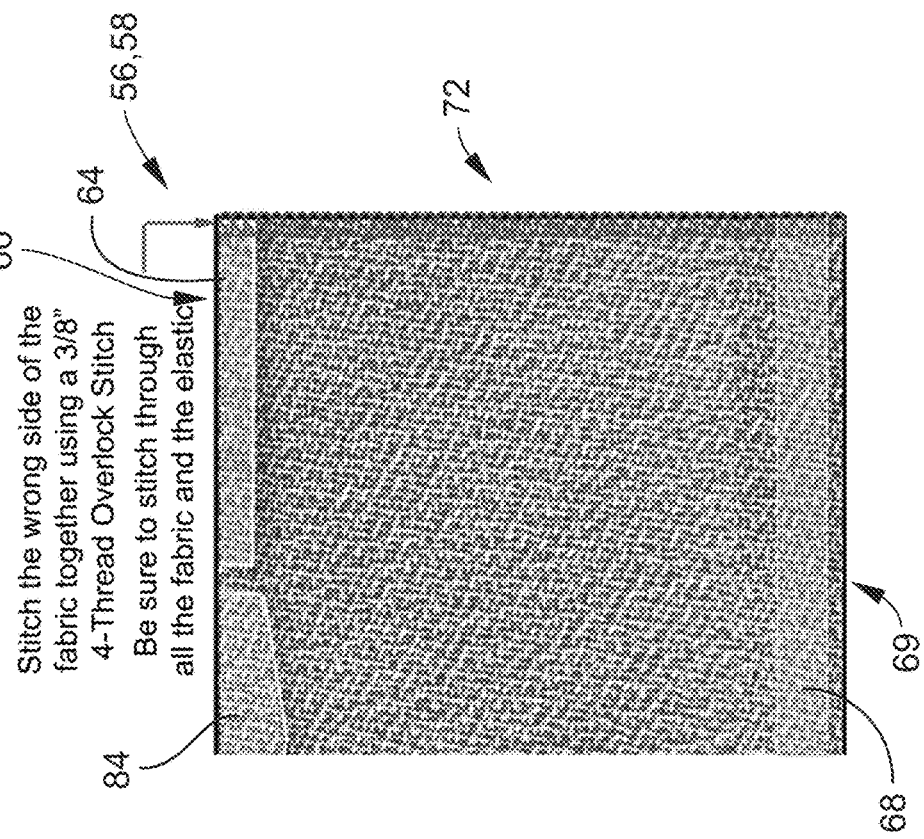
FIG. 12K shows a diagram of the eleventh step of assembling the gaiter facemask with inherently ionic material and a nose piece of FIG. 3 where the garment is first turned back over so that the garment is facing up, then the right side of the fabric is folded onto itself evenly so that the edges match up, where the wrong side of the fabric is stitched together using a ⅜ inch 4-thread overlock stitch, where the stitch is through all the fabric and the elastic.
Figure 12K:
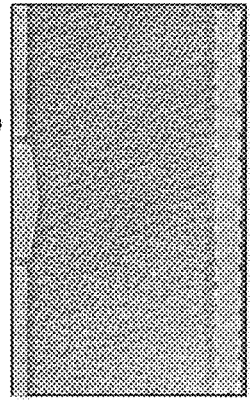
Figure 12K:
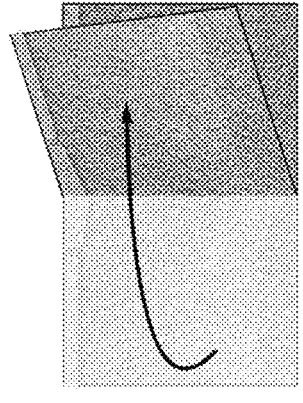
Figure 12K:
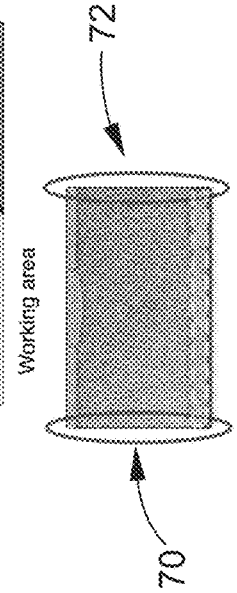

Referring now specifically to FIGS. 6, 7, and 11, in select embodiments of personal protective equipment face covering 10 with inherently ionic materials 16, personal protective equipment face covering 10 may be designed and configured as scarf facemask 60. Scarf facemask 60 may include, but is not limited to, the three layers (44, 48 and 52) of inherently ionic material 16. As best shown in FIG. 11, in select embodiments, scarf facemask 60 with inherently ionic materials 16 may include middle patch section 118, first decorative side section 120, and second decorative side section 124. Middle patch section 118 may include the three layers (44, 48 and 52) of inherently ionic material 16. Middle patch section 118 may include top elastic portion 64 on top 66 of middle patch section 118, and bottom elastic portion 68 on bottom 69 of middle patch section 118, similar to sheet 62 of gaiter facemask 56 and wrap facemask 58. First decorative side section 120 may be attached to first side 122 of middle patch section 118. Second decorative side section 124 may be attached to second side 126 of middle patch section 118. First decorative side section 120 and second decorative side section are optional pieces to attach to middle patch section 118 for reducing materials and costs of scarf facemask 60. Otherwise, middle patch section 118 may be designed and configured as the entire scarf facemask 60. Wherein, when scarf facemask 60 is wrapped around face area 30 of wearer 31 with middle patch section 118 positioned over face area 30, top elastic portion 64 and bottom elastic portion 68 may be configured for maintaining middle patch section 118 over face area 30 of wearer 31.

Referring now specifically to FIGS. 12 and 13, in another aspect, the instant disclosure embraces a method of making personal protective equipment face covering 10 with inherently ionic materials 16 in any embodiment and/or combination of embodiments shown and/or described herein. In general, the disclosed method of making personal protective equipment face covering 10 with inherently ionic materials 16 may include the steps of: providing at least two fabric materials 14 of inherently charged ionic materials 16, wherein at least one of the at least two fabric materials 14 including an inherently positively charged ionic material 32, and at least one of the at least two fabric materials 14 including an inherently negatively charged ionic material 34; and sewing each of the at least two fabric materials 14 of the inherently charged ionic materials 16 together to create personal protective equipment face covering 10. FIG. 12A shows a diagram of the first step of assembling personal protective equipment face covering 10, like gaiter facemask 56 of FIG. 3, with inherently ionic material 16 and nose piece 84, where layers 12 are aligned. FIG. 12B shows a diagram of the second step of assembling gaiter facemask 56 where a thread overlock stitch is made across top 66 of fabric 14, like ¼ inch 4-thread overlock stich. FIG. 12C shows a diagram of the third step of assembling gaiter facemask 56 where a thread overlock stitch is made across bottom 69 of fabric 14, like ¼ inch 4-thread overlock stich. FIG. 12D shows a diagram of the fourth step of assembling gaiter facemask 56 with inherently ionic material 16 and nose piece 84, where nose piece 84 is positioned in the center of the fabric or sheet 62 right below the thread overlock stitching made across top 66 of the fabric. FIG. 12E shows a diagram of the fifth step of assembling gaiter facemask 56 with inherently ionic material 16 and nose piece 84, where the garment is pulled inside out while holding nose piece 84 in place. FIG. 12F shows a diagram of the sixth step of assembling gaiter facemask 56 with inherently ionic material 16 and nose piece 84, where stitching is made down the edges of nose piece 84 to hold nose piece 84 in place and stitching is made below the edge of nose piece 84 to allow foam material 86 of nose piece 84 to move when bent. FIG. 12G shows a diagram of the seventh step of assembling gaiter facemask 56 with inherently ionic material 16 and nose piece 84, where stitch casing is made for top elastic portion 64, like ½ inch down from top 66 of garment straight across stopping ½ inch from edge of nose piece 84. FIG. 12H shows a diagram of the eighth step of assembling gaiter facemask 56 with inherently ionic material 16 and nose piece 84, where the knitted top elastic portion 64 is pulled through the channel between the bottom layer of polyester and middle layer of silk, and then stitching is made down the edge of the elastic from the end of nose piece 84. FIG. 12I shows a diagram of the ninth step of assembling gaiter facemask 56 with inherently ionic material 16 and nose piece 84, where, after the stretch of the elastic is determined, the elastic is stitched while keeping appropriate stretch on elastic, and excess elastic at the edge of the fabric is clipped. FIG. 12J shows a diagram of the tenth step of assembling gaiter facemask 56 with inherently ionic material 16 and nose piece 84, where the garment is first turned over so that the garment is facing up, then the elastic is stretch stitched down ¼ inch up from bottom along left edge, then the top of the elastic is stretch stitched down while keeping constant stretch on the elastic, then the elastic is stretch stitched down ¼ inch up from bottom along right edge, then the bottom of the elastic is stretch stitched down while keeping constant stretch on elastic, and finally excess elastic is trimmed off. FIG. 12K shows a diagram of the eleventh step of assembling gaiter facemask 56 with inherently ionic material and nose piece 84, where the garment is first turned back over so that the garment is facing up, then the right side of the fabric is folded onto itself evenly so that the edges match up, where the wrong side of the fabric is stitched together using a ⅜ inch 4-thread overlock stitch, where the stitch is through all the fabric and the elastic.

Applicant notes, that steps 1-10 in FIGS. 12A-12J are similar for creating both gaiter facemask 56 and wrap facemask 58. For wrap facemask 58, for step 11, instead of stitching the edges together for creating loop 74 of gaiter facemask, removable attachment 116 is added to the edges for creating the removable attachment of wrap facemask 58.

Figure 13A:
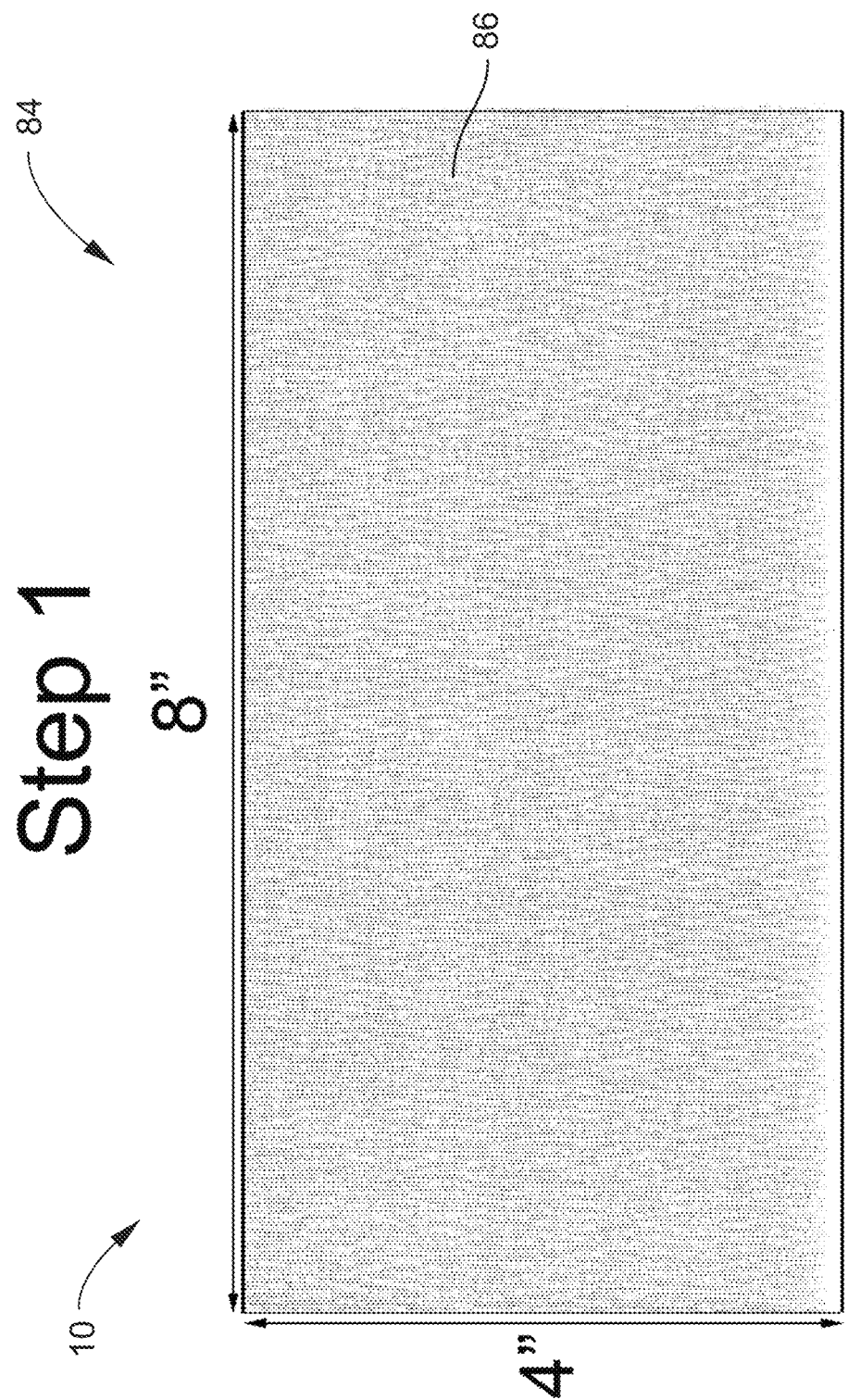
FIG. 13A shows a diagram of the first step of creating the nose piece for the gaiter facemask with inherently ionic material and a nose piece of FIG. 3 where the material is first provided in the desired dimensions.
Figure 13B:
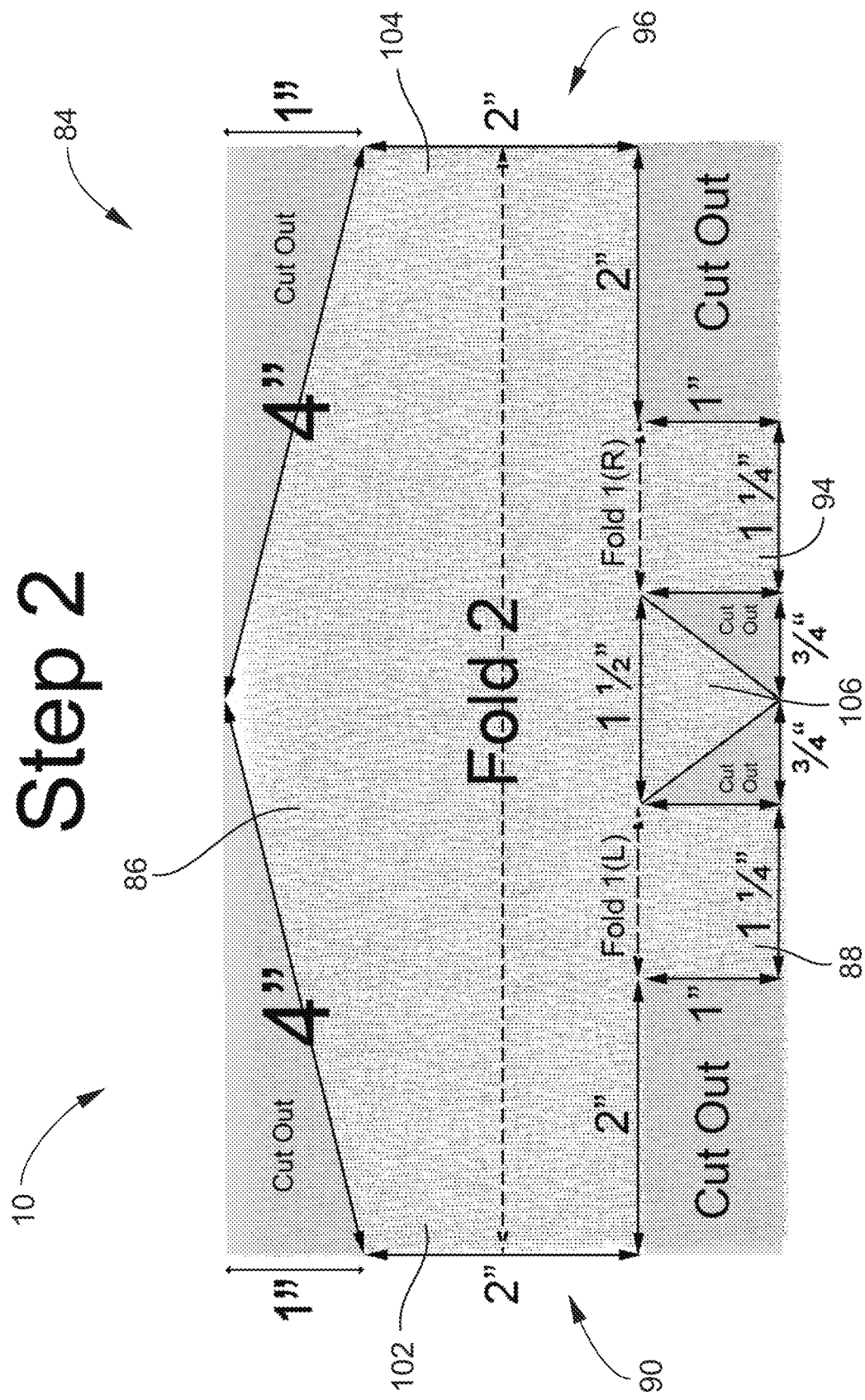
FIG. 13B shows a diagram of the second step of creating the nose piece for the gaiter facemask with inherently ionic material and a nose piece of FIG. 3 where the material is cut out according to the shown pattern.
Figure 13C:
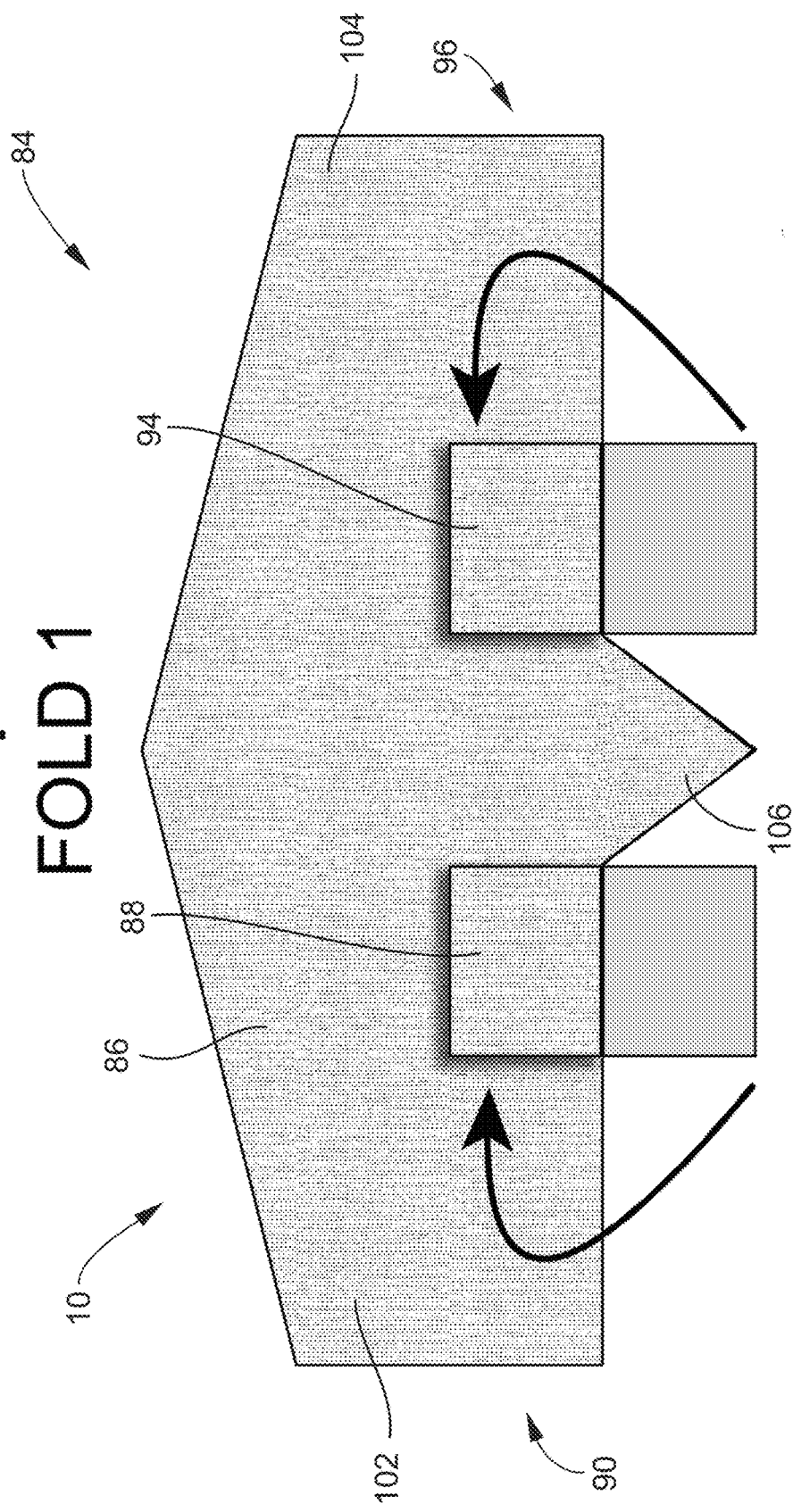
FIG. 13C shows a diagram of the third step of creating the nose piece for the gaiter facemask with inherently ionic material and a nose piece of FIG. 3 where only the square tabs are folded down onto the foam.
Figure 13D:
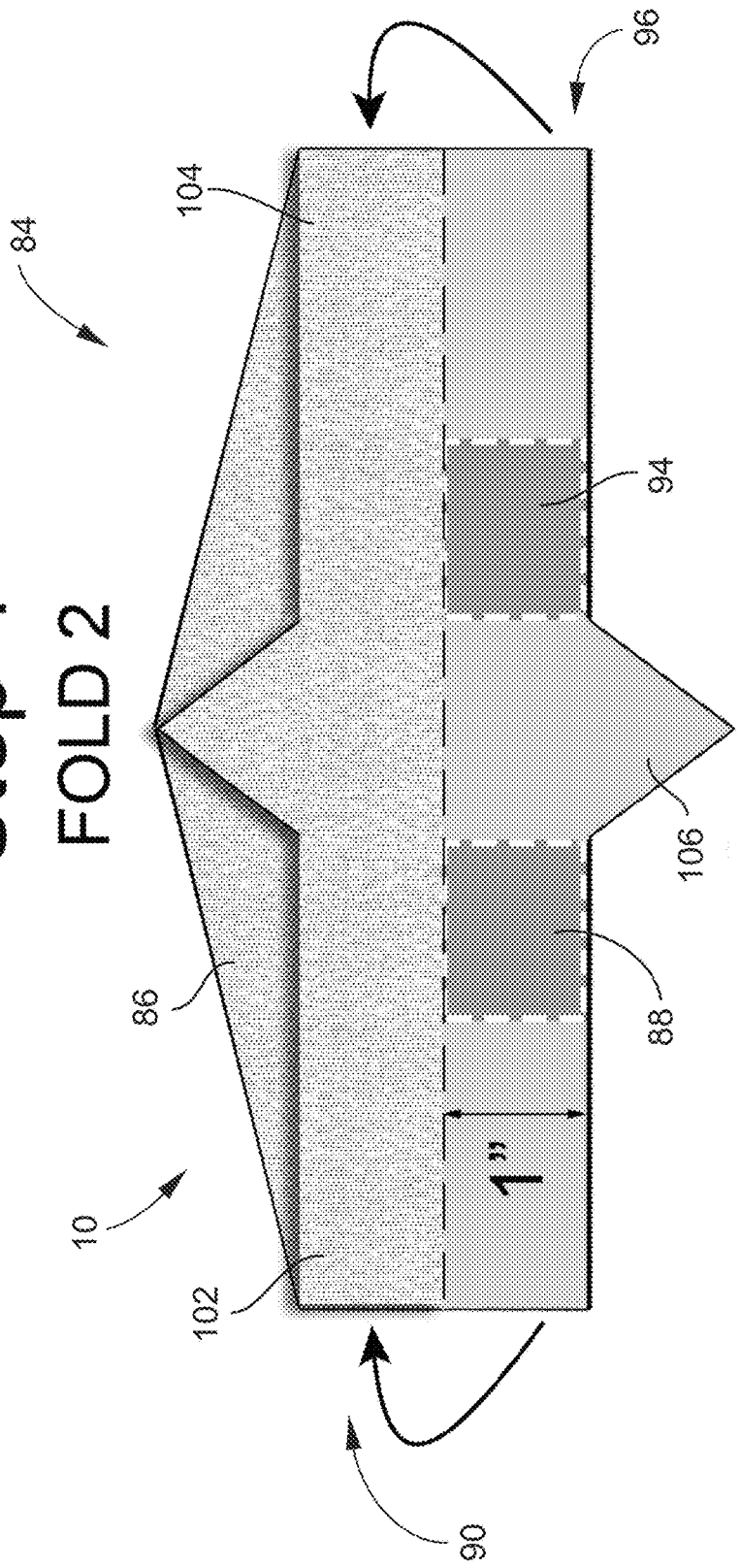
FIG. 13D shows a diagram of the fourth step of creating the nose piece for the gaiter facemask with inherently ionic material and a nose piece of FIG. 3 where, while holding the square tabs folded down in step 2, the foam is folded down onto itself at the 1-inch mark.
Figure 13E:
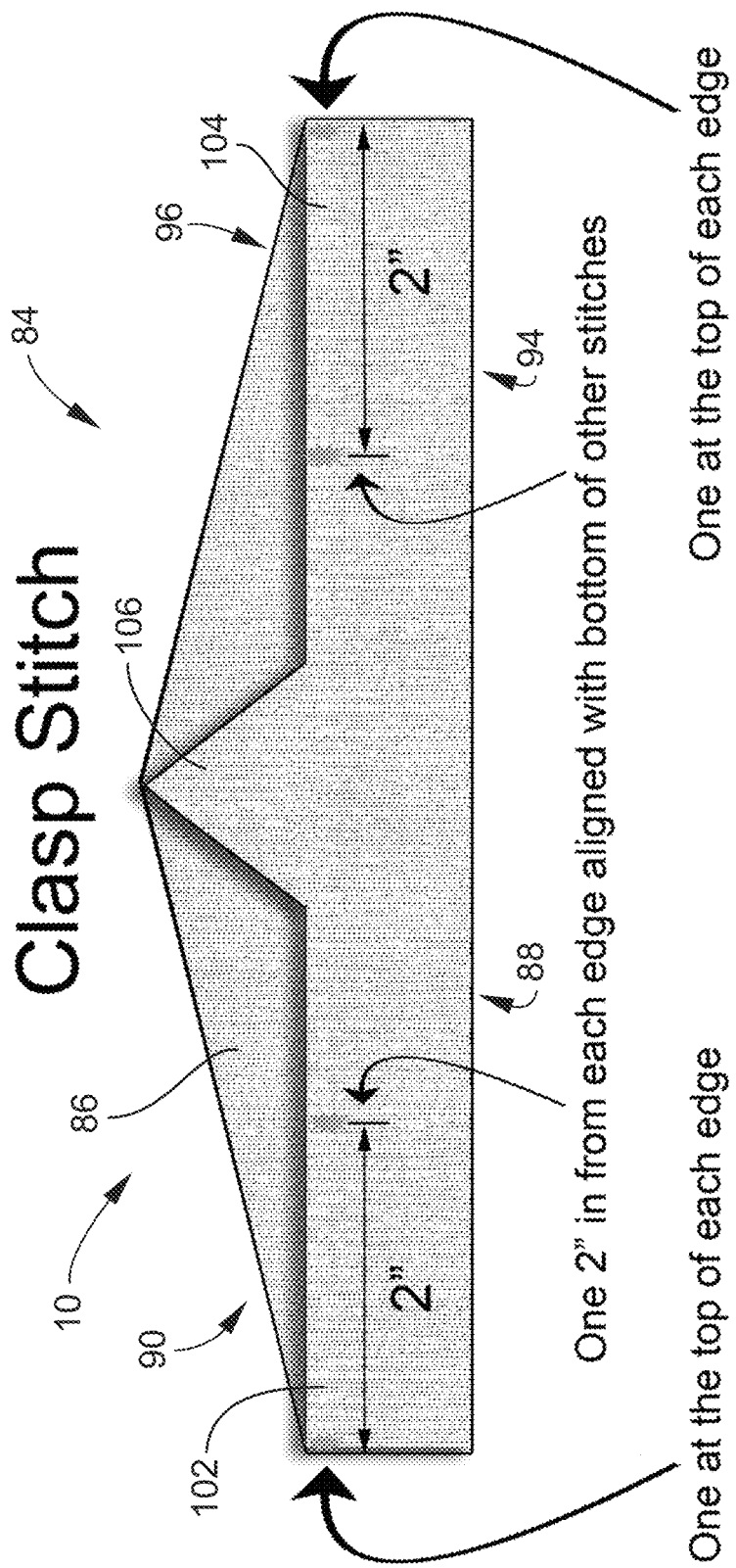
FIG. 13E shows a diagram of the fifth step of creating the nose piece for the gaiter facemask with inherently ionic material and a nose piece of FIG. 3 where clasp stitches are made, one 2 inches in from each edge aligned with the bottom of the other stitches.

Referring now specifically to FIGS. 13A-13E, a method is shown for creating nose piece 84 from foam material 86. FIG. 13A shows a diagram of the first step of creating nose piece 84 for gaiter facemask 56 and/or wrap facemask 58 with inherently ionic material 16, where foam material 86 is first provided in the desired dimensions. FIG. 13B shows a diagram of the second step of creating nose piece 84, where foam material 86 is cut out according to the shown pattern. FIG. 13C shows a diagram of the third step of creating nose piece 84, where only the square tabs are folded down onto foam material 86. FIG. 13D shows a diagram of the fourth step of creating nose piece 84, where, while holding the square tabs folded down in step 3, foam material 86 is folded down onto itself at the 1-inch mark. Finally, FIG. 13E shows a diagram of the fifth step of creating nose piece 84, where clasp stitches are made, one 2 inches in from each edge aligned with the bottom of the other stitches.

Personal protective equipment face covering 10 with inherently ionic material 16 may be constructed using a filter matrix of select woven fabrics 22 as opposed to conventional non-woven masks. This technology may be designed to exploit the fact that microbes and many other airborne contaminants have inherent ionic charges that can be negative and/or positive. Opposite charges attract each other while like charges repel. Most fabrics like cotton and many synthetics have very little net ionic charge. Other fabrics have a significant inherent positive or negative charge and some of those fabrics can be modified to further increase their charge. Charged fabrics act as what are termed electron donors or electron acceptors.

The forces of ionic charge differences are used in several scientific areas. For example, in the fields of vaccine production, gene therapy and virus purification, the biopharmaceutical industry routinely utilizes a powerful technique termed "ion exchange chromatography" to purify or remove virus. With this method, the virus or other charged molecule can be pulled out of a liquid stream and immobilized onto an oppositely charged chromatography matrix. This very effective method allows other non-specific materials with less or opposite charge to flow through the matrix thus purifying and concentrating the virus on the chromatography matrix. Release of the purified bound material is then accomplished by treatment with reagents that neutralize the charge such as simple salt solutions or small pH changes thus regenerating chromatography support.

The technology of personal protective equipment face covering 10 with inherently ionic material 16 may be fundamentally the same as liquid chromatography except that contaminant are pulled out of an air stream rather than liquid stream. To obtain an even greater removal of microbial contaminants, fabric treatments can be developed to further increase positive or negative charges. The disclosed personal protective equipment face covering 10 with inherently ionic material 16 may use at least two fabrics 14 in two or more layers 12 each. One fabric 14 may be positively charged and the other fabric 14 may be negatively charged. The ionic charge on these fabrics may come from its molecular structure and should not be confused with electrostatic charge as is generated by rubbing two dissimilar materials together or what is termed "triboelectric effect". High voltages can be triboelectrically generated in fabrics and other materials and this static electricity can improve the filtering efficiency as has been used in filters for HVAC systems. However, in practical use, as personal protection face covering devices, almost all triboelectric charge is quickly dissipated by moisture in the breath of the wearer. As such, triboelectricity provides little additional affinity for removal of oppositely charged airborne contaminants Personal protective equipment face covering 10 with inherently ionic material 16 technology does not rely on triboelectricity, but rather on selecting and/or modifying fabrics for inherent molecular ionic charge.

Because ionic charge attraction and repulsion operates over relatively large distances up to several millimeters, relatively sheer, open weave fabrics 22 can be used to effect highly efficient removal of airborne particles. The use of more open weave, ionic fabrics means that the air flow from inhalation and exhalation may not be as restricted as with N95 masks. With air passing more easily through the open weave fabrics 22, less air will escape around the periphery of personal protective equipment face covering 10 with inherently ionic material 16. The critical property of less obstructed air flow or breathability significantly reduces the comfort limitations of N95 masks: heat & moisture buildup, restrictive breathing, and dependency on a tight, uncomfortable fit that is difficult to achieve and maintain in practical use. Accordingly, personal protective equipment face covering 10 with inherently ionic material 16 may be designed to encircle neck 28 and face area 30 of wearer 31, thereby, protecting a much greater area of skin compared to conventional masks. This design offers greater filtration surface area than surgical masks and N95 respirators. The data below show the performance of the personal protective equipment face covering 10 with inherently ionic material 16, namely gaiter facemask 56, relative to N95 masks and surgical masks.

EXAMPLES

The instant disclosure may be directed to methods to better characterize performance of protective face coverings. The methods described below are more comprehensive, relevant and quantitative as compared to existing certification criteria. These methods were used to compare various conventional face filtering solutions as well as some new materials and designs.

Particle Counting: Current NIOSH certification of N95 masks is performed using particles generated from NaCl and corn oil aerosols. Candidate masks are glue sealed over a test apparatus to avoid peripheral infiltration or otherwise tested on human subjects carefully fitted to achieve maximal filtration efficiency. It is arguable how well these particles and unrealistic fit conditions represent performance for filtration of microbes and other airborne disease-causing particles in the workplace. To generate data on hazardous particles that is also representative of how face masks are actually worn, a special apparatus was designed using a headform manikin Particles evading the mask filtration are counted using the previously described instrument. With this testing apparatus, one can test individual and environmentally relevant particles such as aerosolized liquid suspensions of pure cultures of bacteria, virus, mold and fungus and dry particles such as talc, pollen, stone dust and other industrial dusts that otherwise could not be safely tested on human subjects and collect data relevant to how the various face coverings are actually fitted and comfortably worn.

Microbial Detection: Microbial air challenge was performed using a microbial air sampling instrument (IUL Spin Air instrument sold through Neutec Group, Inc.) certified for testing in laboratories and drug manufacturing facilities. The manikin with mask is placed inside a conical chamber with a volume of ~12 L and connected by tubing to the air sampler exterior to the chamber. An aerosolized suspension of challenge microbes is introduced by a spray bottle into the top of the chamber under negative pressure provided by the air sampler. The spray bottle that releases a fine spray of ~125 µL in volume. This spray contains a heterogeneous array of droplet sizes somewhat similar to those emitted by talking, sneezing and coughing. The larger droplets will fall quickly by gravity while fine aerosols will remain in suspension for up to several minutes. Microbes like bacteria, mold and fungus passing through or around the mask are distributed/plated onto a petri dish placed inside the air sampler. After 24 to 48 hours of incubation to promote growth, microbes evading filtration are quantified by counting the number of colony forming units (CFU) seen on the petri dish. See the Results section for a further description of this experiment and how it is modified to test for virus filtration.

Breathability/Comfort: N95 masks when properly fitted are uncomfortable for extended wear. The restriction of air flow is problematic for wearers who have respiratory restrictions and heart problems or a psychological objection to wearing a tight device over their face. Headache, heat retention, moisture buildup, fogging of eye wear, and odor generation are common objections that discourage people from wearing or properly fitting masks. This critical property of breathability was measured both quantitatively and systemically. A dual port manometer (Fieldpiece Model SDMN5) is used to quantitate the pressure drop across various filter matrices. Because restriction of air flow can be a systemic health issue for people with underlying lung or heart disease, data is presented on respiration and pulse rates and oxygen saturation of wearers with and without various types of face covering devices using a finger-tip pulse oximeter.

Protection of the Public from Infected Persons: Personal protection devices should not only protect the wearer from airborne contaminates, but when worn by an infected person should minimize the amount of microbes they shed (exfiltrated) into the air. There can be significant construction differences among N95 certified masks. In an effort to make the mask more comfortable, some N95 masks contain a 1-way flow check-valve that allows exhaled air to be more easily released. While 1-way valves may provide a minimal improvement in comfort, those masks will only protect the wearer and are much less effective in protecting the public from infected wearers. Conventional face masks are not routinely tested for exfiltration efficiency. Thus, an apparatus was designed that allows face coverings to be quantitatively compared for their ability to minimize exfiltration. This device simulates aerosols generated from coughing through the manikin that are then counted using a laser particle counter exterior to the mask.

Results and Discussion: Efforts to make conventional size-exclusion masks more efficient by using more size-exclusive filtration material and/or by achieving a tighter fit become self-limiting due to comfort and breathability limitations. Using the comprehensive characterization methods discussed above, potentially superior personal protection face covering designs were tested according to the instant disclosure of a gaiter facemask and scarf with inherently ionic material and an improved gaiter design. The gaiter facemask disclosed herein may use two principles of physics to provide reduction in airborne contaminants. The disclosed gaiter facemask may provide some size-exclusion filtration but augments this by exploiting principles of electro-physics. As the data below show, the disclosed gaiter facemask device with inherently ionic material consistently provides better filtration than the N95 while overcoming the comfort and fit limitations previously discussed.

Filtration Efficiencies for Inhaled Air: Table 2 below compares particle filtering efficiencies of N95 and surgical masks with various fits to the disclosed gaiter facemask device with inherently ionic material, hereinafter just the "DISCLOSURE". Individual particle types were tested by placing the manikin inside the previously describe conical inoculation chamber. The laboratory air is HEPA filtered to reduce ambient environmental airborne contaminants to insignificant levels relative to the particle being inoculated. A known mass of challenge particles is introduced into the top of the chamber under slight negative pressure. Particles evading filtration are counted for 5 minutes using the laser particle counting instrument. Total inoculant counts were first performed without a mask to allow for calculations of efficiency. The "office air" experiment was performed in a typical office setting with HVAC air pre-filtered by low efficiency air handler filters rather than HEPA filtration. The office air contains a heterogeneous mixture of typical airborne contaminants including various dust particles, microbes, and pollen. To achieve the "Perfect Fit" for the N95 mask, the mask edges were sealed to the manikin face with a glue so that air could only pass through the non-woven filter matrix. "Practical Fit" represents what is believed to be a typical best fit found under most real use conditions. Fitting for the DISCLOSURE involves pulling it over the head down to the neck and then simply pulling the top elastic edge up and over the nose. No glue was used to affect a perfect fit for the DISCLOSURE. The DISCLOSURE provided filtering efficiencies from 98.0 to 99.9% for all challenge particles. The "Perfect Fit" of the N95 mask gave the next best overall efficiencies ranging from 92.8 to 99.7%. The N95 "Practical Fit" efficiencies were significantly below the N95 "Perfect Fit" averaging around 80%. The surgical mask "Practical Fit" consistently yielded the poorest filtration.

TABLE 2

Filtering Efficiencies of Various Relevant Particles with Conventional Masks and the DISCLOSURE

| Filter Device & Fit | Challenge Particle | % Removal of Particles 0.1µ to 0.5µ in Size | % Removal of Particles > 0.5µ in Size |
|---|---|---|---|
| DISCLOSURE | *Aspergillus niger* fungus spores | 99.0 | 99.2 |
| N95 Perfect Fit | *Aspergillus niger* fungus spores | 92.8 | 93.3 |
| N95 Practical Fit | *Aspergillus niger* fungus spores | 80.2 | 80.0 |
| Surgical Mask Practical Fit | *Aspergillus niger* fungus spores | 57.2 | 58.1 |
| DISCLOSURE | *Penicillium brevi* mold spores | 99.8 | 99.8 |
| N95 Perfect Fit | *Penicillium brevi* mold spores | 94.5 | 94.5 |
| N95 Practical Fit | *Penicillium brevi* mold spores | 73.5 | 74.5 |
| Surgical Mask Practical Fit | *Penicillium brevi* mold spores | 57.2 | 58.1 |
| DISCLOSURE | Wood ash | 99.6 | 99.7 |
| N95 Perfect Fit | Wood ash | 97.8 | 98.2 |
| N95 Practical Fit | Wood ash | 79.5 | 83.5 |
| Surgical Mask Practical Fit | Wood ash | 32.7 | 43.2 |
| DISCLOSURE | Talcum powder | 99.8 | 99.9 |
| N95 Perfect Fit | Talcum powder | 98.1 | 98.1 |
| N95 Practical Fit | Talcum powder | 77.0 | 76.6 |
| Surgical Mask Practical Fit | Talcum powder | 69.8 | 69.1 |
| DISCLOSURE | Tree pollen (mixture of oak and pine) | 99.8 | 99.7 |
| N95 Perfect Fit | Tree pollen (mixture of oak and pine) | 99.7 | 99.6 |
| N95 Practical Fit | Tree pollen (mixture of oak and pine) | 94.3 | 94.5 |
| Surgical Mask Practical Fit | Tree pollen (mixture of oak and pine) | 42.5 | 43.5 |
| DISCLOSURE | Stone dust (from stone cutting) | 99.7 | 99.8 |
| N95 Perfect Fit | Stone dust (from stone cutting) | 99.4 | 99.4 |
| N95 Practical Fit | Stone dust (from stone cutting) | 91.1 | 91.3 |
| Surgical Mask Practical Fit | Stone dust (from stone cutting) | 80.1 | 81.8 |
| DISCLOSURE | Cement dust | 98.0 | 98.4 |
| N95 Perfect Fit | Cement dust | 99.0 | 99.1 |
| N95 Practical Fit | Cement dust | 93.8 | 93.7 |
| Surgical Mask Practical Fit | Cement dust | Not tested | Not tested |
| DISCLOSURE | Plaster/Dry wall dust | 99.4 | 99.6 |
| N95 Perfect Fit | Plaster/Dry wall dust | 99.0 | 99.1 |
| N95 Practical Fit | Plaster/Dry wall dust | 89.6 | 90.3 |
| Surgical Mask Practical Fit | Plaster/Dry wall dust | 41.0 | 43.2 |
| DISCLOSURE | Office air | 98.3 | 98.4 |
| N95 Perfect Fit | Office air | 96.6 | 98.2 |
| N95 Practical Fit | Office air | 81.7 | 83.5 |
| Surgical Mask Practical Fit | Office air | 24.3 | 33.2 |

Bacteria and Virus Filtration: Table 3 below shows filtration efficiencies for 2 bacterial strains (Staphylococcus epidermidis and Lactobacillus acidophilus). The bacteria were suspended in a phosphate buffered saline and inoculated by fine spray aerosolization into the top of the manikin test chamber as 5 separate aerosol dispersions of approximately 12510 each over a period of 5 minutes at a flow rate of 100 L/minute. Air passing through or around the mask and into the manikin tubing is routed to a IUL Spin Air, Neutec Group microbial air sampling unit rotating at 4 rpm. The air sampling device plates the bacteria onto a petri dish with TSA Agar as the growth medium. Three separate petri dishes were inoculated for the control and each face covering device and fit. Inoculated plates were placed into a 30° C. incubator. Colony forming units (CFUs) were counted after 48 hours of culture. The CFUs for the triplicsheet ate petri dishes were added with the total shown in column 3 of Table 3. The calculation of % reduction was determined by dividing the total CFUs for each face covering by the control CFUs with mask. As seen with dry particles, the DISCLOSURE filters bacteria in wet aerosol suspensions better than the N95 perfect fit.

TABLE 3

Bacteria Filtration Efficiencies of DISCLOSURE versus N95 Mask - Growth Based Detection

| Filtration Device | Inoculum | Total CFUs in 3 Petri Dishes | % Reduction from Control |
|---|---|---|---|
| No mask, control | Staphylococcus | 196 | NA |
| DISCLOSURE | Staphylococcus | 1 | 99.5 |
| N95 Mask Perfect Fit | Staphylococcus | 9 | 95.4 |
| N95 Practical fit | Staphylococcus | 26 | 86.7 |
| Surgical Mask | Staphylococcus | 150 | 23.5 |
| No mask, control | Lactobacillus | 684 | NA |
| DISCLOSURE | Lactobacillus | 4 | 99.4 |
| N95 Mask Perfect Fit | Lactobacillus | 16 | 97.7 |
| N95 Practical fit | Lactobacillus | 78 | 88.6 |
| Surgical Mask | Lactobacillus | 551 | 19.4 |

As for virus filtration, there are few studies demonstrating the quantitative efficiency of conventional masks for filtration of virus. These studies used infectious flu virus and thus do not provide a safe or practical way to routinely measure virus filtration properties of PPE. It should be noted virus particles are much smaller than the 0.3-micron specification used to certify N95 masks. In the two above referenced studies, surgical masks were reported to provide minimal efficacy for removal of virus from small particle aerosols and larger droplets. N95 respirators provided better protection but this was very much fit dependent. Given the ionic properties and design features of the DISCLOSURE and its ease of fit, it was hypothesized that it might filter virus better than N95 respirators. For this experiment a non-infectious virus, MVM as used by the biopharmaceutical industry to demonstrate viral clearance from the purification of biopharmaceuticals was inoculated as an aerosol into the manikin chamber as described above. Air passing through the filtering device was captured onto a virus absorbing ionic membrane. The virus was eluted from the membrane using a NaCl salt solution and then tested by a quantitative immuno-PCR assay kit from Cygnus Technologies. The quantity of virus captured on the membrane was first calculated as the % filtration relative to no mask. The N95 mask captured 92.7% of the virus with the DISCLOSURE capturing 99.4%. Since it is virus evading filtration that has the potential to cause infection, we recalculated the difference between the N95 and the DISCLOSURE from the perspective of how much virus gets through each device, the N95 failed to filter 7.3% of the virus while the DISCLOSURE failed to filter By analyzing the data in this way, it can be seen that the DISCLOSURE provides a 12.2-fold reduction in unfiltered virus compared to the N95 (7.3%/0.6%=12.2).

Breathability Testing: Table 4 below measures the breathability of conventional non-woven masks versus the DISCLOSURE. Measurements were taken at a flow rate of 3 L/min through 1.22 cm$^2$ of matrix surface area. The filtration matrix was tightly sealed over the test surface area to ensure air flowed only through the filtration matrix. Units of measurement are in centimeters of water measured using a dual port manometer. The more negative the reading the more restrictive the air flow. The DISCLOSURE showed 6.60 fold less pressure drop than the N95 filter material. In actual wearing conditions the lack of a perfect seal for the N95 mask will increase its perceived breathability but at the expense of filtration efficiency.

TABLE 4

Comparisons of Breathability/Pressure Drop for an N95 Mask and the DISCLOSURE

| Filter Device | Mean Pressure Drop (cm of water) n = 6 tests |
|---|---|
| N95 Mask | −2.97 |
| DISCLOSURE | −0.45 |

Restriction of breathing can manifest as an increased respiration and heart rate and for this reason some individuals cannot wear or refuse to wear face masks. Table 5 below is the results of a study measuring average respiration rate, pulse rate and arterial blood oxygen saturation over 5 minutes for 3 healthy male and 2 female subjects at rest. Data was collected with no mask and with the N95 mask (practical fit) and the DISCLOSURE. While the data are not consistent for the 3 parameters, the general trend is that the respiration and pulse rates are trending lower for the DISCLOSURE versus the N95. This indicates that while an N95 practical fit gaiter will be more breathable than a perfect fit, it still restricts breathing more than the DISCLOSURE.

TABLE 5

Effects of Breathing Restriction on Respiration and Heart Rate

| Test Subject | Face Covering | Respiration Mean Rate | Pulse Mean rate | Oxygen Saturation |
|---|---|---|---|---|
| Male #1 | No mask | 7.6 | 63.9 | 96.9 |
| Male #1 | DISCLOSURE | 7.8 | 64.2 | 97.9 |
| Male #1 | N95 | 8.6 | 65.4 | 98.0 |
| Male #2 | No mask | 7.2 | 64.8 | 98.9 |
| Male #2 | DISCLOSURE | 8.0 | 66.5 | 98.3 |
| Male #2 | N95 | 9.0 | 69.9 | 98.0 |
| Male #3 | No mask | 10.0 | 63.5 | 95.8 |
| Male #3 | DISCLOSURE | 9.6 | 63.0 | 96.8 |
| Male #3 | N95 | 10.8 | 63.7 | 96.2 |
| Female #1 | No mask | 9.0 | 57.1 | 99.0 |
| Female #1 | DISCLOSURE | 10.0 | 57.4 | 97.4 |
| Female #1 | N95 | 10.8 | 55.5 | 97.0 |
| Female #2 | No mask | 6.4 | 59.1 | 98.8 |
| Female #2 | DISCLOSURE | 7.4 | 57.4 | 97.7 |
| Female #2 | N95 | 7.2 | 60.0 | 97.4 |

Breathability and Filtration Efficiencies of Other Face Coverings and Fabrics: The shortage of masks during the COVID-19 outbreak resulted in recommendations to makeyour-own face covering out of common fabrics using sewing patterns found on the internet. In addition, several companies have re-tooled their manufacturing operations to meet the demand for PPE. Many of these devices have clever, stylistic designs with attractive fabric prints. Few if any of these devices have received official certification and most use similar patterns and constructions in common with surgical mask designs. We have obtained numerous masks for evaluation some of which claim design or materials improvements. Table 6 below summarizes testing for particle counting and pressure drop testing on other devices sourced shown in column 1 of Table 6. The wisdom that "some filtering is better than nothing" is logical, but as the data shows, most of these devices are inferior to the N95 and the DISCLOSURE and as such may give the wearer a false sense of security.

To measure breathability of these devices, pressure drop testing was performed as previously described. Not all devices or fabric combinations could be made to fit the manikin well-enough and in those cases particle counting was performed by placing the mask over a bowl and sealing the bowl with elastic to provide a "Perfect Fit". See column 3. In real use a "Perfect Fit" is not achievable and for that reason the G to P device constructions are expected to have even lower efficiencies under practical wearing conditions. In cases where a "Good Fit" could be obtained over the manikin, particle count data is show in column 4. It is noted that the 5 least breathable devices, A, B, C, E and F, yielded the poorest particle filtration efficiencies ranging from 26.2% to 39.5%. These devices have similar construction. All are made with outside and inner most layers of fabric and a middle pouch into which the wearer must insert a small rectangular, disposable filter made from a non-woven matrix similar to those used in conventional masks. While the inclusion of a non-woven insert might seem a logical way to improve filtration efficiency, in practice the large pressure drops cause both inhaled and exhaled air to take the path of least resistance around the filtration matrix with the result that these constructions provide very poor particle filtration efficiency. Fabrics tested in N, O, P and Q employed claimed anti-microbial functionality through the incorporation of silver, copper, or activated carbon into the fabric. As with other mask-like designs, the filtration efficiencies were much inferior to the DISCLOSURE

TABLE 6

Breathability and Particle Filtering Efficiency Data for Other Fabrics & Uncertified Masks Sold Commercially and "Do-It-Yourself" Patterns

| Filter Device | Pressure Drop (cm of water) | Filtration % for Particles from 0.1 to ~1.0 Microns | |
|---|---|---|---|
| | | Perfect Fit | Practical Fit on Manikin |
| N95 3M 8210 | −2.97 | 99.7 | 81.2 |
| DISCLOSURE | −0.43 | 98.3 | 99.6 |
| A - Surgical mask construction: cotton/polyester blend layers top & bottom with activated carbon, non-woven filter insert with a PM2.5 rating | −5.61 | 50.3 | 36.1 |
| B - Surgical mask construction: cotton fabric top & bottom non-woven filter insert | −8.79 | 56.4 | 35.6 |
| C - Surgical mask construction: cotton layers top & bottom with activated carbon, non-woven filter insert | −2.26 | 78.4 | 39.5 |
| D - Neck warmer (Gaiter) design: 3 layers, hemp fabric top and bottom with non-woven filter material described as "nano fiber" as the inside layer | −2.24 | 98.5 | 52.0 |
| E - Neck warmer design (gaiter): Cotton top & bottom with non-woven filter insert | −4.44 | 95.4 | 26.2 |
| F - Traditional rectangular surgical mask non-woven | −2.84 | 97.9 | 31.3 |
| G - Copper & zinc infused polyester-spandex "gaiter" with cotton-polyester filter insert | −2.34 | 31.3 | 11.1 |
| H - Surgical mask design made from 4 layers of cotton | −0.66 | 54.0 | Not tested |
| I - Surgical mask design made from 4 layers of silk | −0.48 | 25.3 | Not tested |
| J - Surgical mask design made from 4 layers of 50/50 cotton polyester blend | −0.69 | 82.0 | Not tested |
| K - 4 layers of a merino wool scarf | −0.25 | 46.9 | Not tested |
| L - 4 layers of a viscose scarf | −0.61 | 27.0 | Not tested |
| M - 4 layers of polyester spandex neck warmer/UV protection scarf | −0.79 | 69.4 | Not tested |
| N - 4 layers of a polyester fashion accessory scarf | −0.56 | 48.1 | Not tested |
| O - Silver fiber fabric, 4 layers | −0.41 | 39.4 | Not tested |
| P - Silver impregnated fabric, 2 layers | −2.41 | 36.2 | Not tested |
| Q - Copper treated fabric | −0.89 | 48.1 | Not tested |
| R - Activated carbon | −0.61 | 56.4 | Not tested |

Exfiltration of Particles from Infected Wearers: Protective face coverings can minimize the amount of infectious agent shed into the environment when worn by subjects with infectious respiratory disease. Two experiments were performed to demonstrate the relative quantities of particles released upon the act of coughing. The first experiment used videography to qualitatively demonstrate how aerosols escape around or through various face coverings when the air is propelled by the act of coughing. In this method, back-light from a laser to visualize aerosol droplets expelled into the air was used. The velocity, distance traveled, and relative amounts of aerosol generated can all be measured. This method has allows the comparison of various devices and fits.

For a 2nd experiment, a testing chamber and particle counting apparatus were designed to more quantitatively determine how much aerosol is dispersed into the air in close proximity to a subject who coughs. Experiments were performed in a HEPA filtered lab so that background particle counts are greatly minimized relative to the test particle. The challenge particle is a micronized benzocaine powder suspended in a liquid solution containing water, glycerol, isopropyl alcohol and cyclomethicone. This solution was selected to simulate the density, viscosity and surfactant properties of mucosal secretions. The benzocaine challenge solution contains a heterogeneous range of particle sizes from <0.1 to 1.0 micron. Particles evading mask filtration were measured by first introducing the benzocaine solution into a tube dosing chamber at the back of the manikin head that connects through the head to the mouth and nose of the manikin. The force used to expel the test particles is provided by a human subject coughing into the 1.6 mm diameter tubing immediately after particle solution was introduced. The laser particle counting device was placed at 2 feet from the face of the manikin Measurements were taken without a mask to provide a baseline particle count. Particles were counted over a 5-minute period representing 15 liters of sampled air. Background counts were measured just before each experiment and subtracted from the readings, as shown in Table 7 below. The experiment was repeated 5 times for each device and the results averaged to normalize the data for variables in the dosing method and other factors such as air currents within the HEPA lab. The following mask types were tested: Conventional surgical mask, N95 mask with a 1-way out-flow valve, N95 mask without the 1-way valve, and the DISCLOSURE.

TABLE 7

Particles Escaping Mask Filtration after a Cough (mean counts for 5 measurements)

| Device | 0.5μ Particles/15 L | 1.0μ Particles/15 L | % Filtered at 0.5μ | % Filtered at 1.0μ |
| --- | --- | --- | --- | --- |
| No mask | 23369 | 8322 | NA | NA |
| Surgical mask | 5413 | 1360 | 76.8 | 83.7 |
| N95 mask with 1-way valve | 2906 | 819 | 87.6 | 90.2 |
| N95 mask without 1-way valve | 3130 | 757 | 86.7 | 90.9 |
| DISCLOSURE | 1607 | 455 | 93.1 | 94.5 |

All 4 devices provide some level of reduction in particles. Surgical masks are the least effective. The DISCLOSURE gave the best performance at 94.5%. This was expected given the DISCLOSURE construction. First, it provides a tighter fit wrapping around the circumference of the neck and face. Second, the DISCLOSURE uses a more hydrophilic fabric that better adsorbs liquid aerosols compared to hydrophobic, non-woven fibers used in masks and respirators. Third, the effective surface area of the disclosed gaiter design provides less pressure drop thus minimizing air forced out around the edges as happens with conventional mask designs.

Shedding of the Filter Matrix: During the course of particle counting experiments it was observed that masks showed much higher counts on initial tests that diminished with continued use. Analysis of that data suggested that the masks were shedding fine particles from the filter matrix itself. To test for this, a new unused N95 mask, an N95 mask used approximately 20 times and the DISCLOSURE that had been laundered were fitted over the manikin and particle counts taken in a typical office environment where the room air was filtered by a low efficiency HVAC system. Background readings were performed to count environmental air particles in two size ranges not filtered by each device and are recorded in Table 8 below, in columns 2 & 3. Each device was then subjected to touching or tapping on the outside to simulate energy imparted in fitting and adjusting a mask. Columns 4 & 5 in Table 8 below show the particle counts over 1 minute of mask filtering after applying the shedding energy and after subtracting the background particle shredding from columns 2 & 3. All devices showed some shedding with the new N95 shedding 10 times more particles than the DISCLOSURE. N95 masks are constructed from spun, melt blown polymeric fibers that are bonded together with heat and chemical agents. In addition, these masks may be treated with fire retardant agents and other agents to reduce moisture absorption, odor and to minimize microbial growth. Not all N95 rated masks have been tested in this study nor is the chemicals used known. It is not known whether the observation of particles shedding has not been investigated but perhaps this is a potential health concern that should be addressed particularly for workers required to wear these devices frequently.

TABLE 8

Particle Shedding Comparisons

| Test Device | Background | | Shed Particles | | Mask Condition |
| | 0.1 to 0.5μ | >0.5μ | 0.1 to 0.5μ | >0.5μ | |
| --- | --- | --- | --- | --- | --- |
| Room Air No Mask | 2784 | 477 | NA | NA | NA |
| New N95 Mask | 56 | 22 | 3119 | 2303 | Unused |
| Used N95 Mask | 54 | 22 | 294 | 187 | Used > 20 times |
| DISCLOSURE | 2 | 1 | 204 | 64 | Laundered prior to test |

Other Characterization Methods: Smoke testing experiments were performed to observe how air gets around the periphery of conventional masks and the DISCLOSURE. Surgical masks showed infiltration all around the mask. Most of the infiltration around the N95 masks was observed at the sides of the nose bridge even with the moldable metal nose clip and foam strip underneath. No periphery smoke infiltration was observed with the DISCLOSURE.

Capacity experiments were performed by measuring particle capture rate over time for the N95 and the DISCLOSURE. Ambient air containing on average of ~10,000 particles/L in particle size ranges of 0.1 to 0.5 microns was sampled through the N95 mask (Practical fit) and the DISCLOSURE over a period of 4 hours (720 L of air). Table 9 shows both devices continue to filter at high efficiency during this time.

TABLE 9

Mask Efficiency as Function of Time of Use

| Time | DISCLOSURE Capture Efficiency | N95 Capture Efficiency |
| --- | --- | --- |
| 0 Start | 97.7 | 81.7 |
| 2 hours | 96.0 | 78.7 |
| 4 hours | 95.4 | 78.2 |

The alarming incidence of COVID-19 among first responders and healthcare workers indicates a need for better PPE solutions. Improvements can be guided by performing better, more comprehensive, and relevant testing methods similar to those discussed above. Our data demonstrates that non-traditional materials and principles of physics beyond size exclusion can be developed into PPE designs that provide performance superior to N95 respirators for particle filtration, microbial filtration, ease of fit, breathability, and other aspects for comfort Mask specifications are conventionally expressed in terms of the percentage of particles filtered. When comparing mask efficiencies, it might be more relevant to focus on how many particles get through a mask since it is those particles that cause health problems. For example, reviewing the Staphylococcus filtration data in Table #3 and comparing the DISCLOSURE to the N95 Perfect and Practical fits, the DISCLOSURE allowed 0.5% particle penetration compared to penetrations of 4.6% and 13.3% for the N95 Perfect and Practical fits. Using this method of quantitative analysis we can conclude the DISCLOSURE filters 9.2 fold more bacteria than the N95 Perfect fit and 26.6% more than the Practical fit. It is reasonable to conclude that better, practical face covering designs capable of reducing the inhaled bioburden by more than 20-fold should have a significant impact on lowering the transmission of infectious disease from airborne sources.

Product Life Time and Care Instructions: Surgical masks and N95 masks are intended to be disposable. We found no comprehensive performance studies showing how long they are effective and to what degree they are compromised by washing or other methods of disinfection. The COVID-19 pandemic resulted in depletion of PPE reserves with the result of workers wearing the same mask for several days or others trying various unvalidated methods of laundering and disinfection. The disclosed gaiter face mask and scarf with inherently ionic material are intended to be laundered and have been demonstrated to keep its high efficiency after more than 20 washes. Washing should use gentle detergents in warm to hot water. Select fabrics will withstand hot water conditions used on "sterilizing" wash conditions without compromising life or filtration efficiency. In high risk environments or in close proximity to known infected individuals, it is recommended the disclosed gaiter face mask and scarf with inherently ionic material be changed at least daily. For less restrictive areas, data shows the disclosed gaiter face mask and scarf with inherently ionic material filter capacity is unchanged after 3 days of wear in indoor HVAC controlled environments. When using these garments in industrial or other areas with a high concentration of dry particulates, it is recommended to wash the garment after each day of use. Fomite transmission, namely touching a contaminated surface such as the outer surface of the face covering, is a theoretical concern for respiratory airborne microbes. Transmission of infection from touching the outer surface of any face covering has not been quantitatively evaluated for respiratory microbes. In the case of respiratory disease, airborne transmission is obviously the major route of infection and thus any device with filtration advantages should provide the highest level of protection. The disclosed gaiter face mask and scarf with inherently ionic material or any mask that captures/filters microbes is a theoretical source of transmission when touched and simple precautions can be taken to minimize this source of infection. In cases where fomite transmission is deemed a significant source of infection, care should be exercised when removing a face protection device. As an example, for the disclosed gaiter face mask with inherently ionic material, this can be accomplished by pulling out the bottom neck edge and pulling it up to the top edge of the gaiter to encase the outer surface prior to pulling it over the head. Gloves should be replaced or hands washed under those circumstances after mask removal.

In sum, the disclosure focuses on PPE face coverings designed as a gaiter facemask and a scarf with inherently ionic material. These designs can be easily fitted over the nose and mouth when needed to provide airborne contaminant reductions superior to surgical masks and equal to or better than a well-fitted N95 mask. The disclosed gaiter facemask and scarf with inherently ionic material design may provide an easily achieved, reproducible fit to ensure air passes through rather than around the filtering fabric. The disclosed scarf may be a more casual garment with fitting that can be subjective and as such may not filter as efficiently as the disclosed gaiter design. However, both the disclosed gaiter facemask and the scarf with inherently ionic material offer a high level of protection where the goal is to significantly reduce the inhalation of airborne particles and microbial contaminants encountered in public areas such as airplanes, mass transit and cruise lines, and in office and industrial venues like medical labs, office workers, first responders, industrial/manufacturing workers, landscapers, carpenters, painters, stone masons, and hobbyists etc. These garments may be provided in a variety of sizes, colors and fabric prints. When not required, the disclosed gaiter facemask and scarf with inherently ionic material designs can remain around the neck as unobtrusive, ready-to-use garments as part of a uniform or worn as fashionable accessory garments. Based on the data, the disclosed gaiter facemask and scarf with inherently ionic material design may provide superior performance over N95 masks and could logically be applied to environments where there is a known health risk from specific airborne contaminants.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation. The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A personal protective equipment face covering comprising:
    at least one layer, each of the at least one layers including at least one fabric material; and
    wherein, at least one of the at least one fabric material of the at least one layer is an inherently ionic fabric material.

2. The personal protective equipment face covering of claim 1, wherein an ionic charge on the inherently ionic fabric material comes from a molecular structure.

3. The personal protective equipment face covering of claim 2, wherein the ionic charge on the inherently ionic fabric material is not from electrostatic charge or triboelectricity.

4. The personal protective equipment face covering of claim 1, wherein each of the at least one fabric materials comprise open weave fabrics configured to allow unrestricted airflow for inhalation and exhalation, whereby the personal protective equipment face covering is configured to allow less air to escape around a periphery of the personal protective equipment face covering compared to a conventional PPE mask.

5. The personal protective equipment face covering of claim 1, wherein the personal protective equipment face covering is configured to encircle a neck and a face area of a wearer, thereby protecting a greater area of skin compared to a conventional PPE mask.

6. The personal protective equipment face covering of claim 5, whereby a greater filtration surface area is provided compared to a surgical mask and an N95 respirator.

7. The personal protective equipment face covering of claim 1 comprising:
at least two of the fabric material of the at least one fabric material;
at least two layers of the at least one layer, where each layer of the at least two layers includes at least one of the at least two fabric materials;
at least one of the at least two fabric materials is an inherently positively charged ionic material; and
at least one of the at least two fabric materials is an inherently negatively charged ionic material.

8. The personal protective equipment face covering of claim 7, wherein the at least two layers comprising:
at least one of the layers including a polyester fabric, the polyester fabric being the inherently negatively charged ionic fabric material; and
at least one of the layers including a silk fabric, the silk fabric being the inherently positively charged ionic fabric material.

9. The personal protective equipment face covering of claim 8, wherein:
the polyester fabric is a polyester Crepe de Chine fabric; and
the silk fabric is a silk Georgette or silk Habotai fabric.

10. The personal protective equipment face covering of claim 8, wherein the at least two layers comprising:
a first layer of the polyester fabric being a first inherently negatively charged ionic fabric material;
a second layer of the polyester fabric being a second inherently negatively charged ionic fabric material; and
a third layer of the silk fabric being a first inherently positively charged ionic fabric material.

11. The personal protective equipment face covering of claim 10, wherein the personal protective equipment face covering being designed and configured as:
a gaiter facemask including three layers of the inherently ionic fabric material;
a wrap facemask including the three layers of the inherently ionic fabric material; or
a scarf facemask including the three layers of the inherently ionic fabric material.

12. The personal protective equipment face covering of claim 11, wherein the personal protective equipment face covering is designed and configured as the gaiter facemask including:
a sheet of the three layers of the inherently ionic fabric material, the sheet including a top elastic portion on a top of the sheet, and a bottom elastic portion on a bottom of the sheet, a first side and a second side of the sheet are attached together to form a loop configured to go around a face area of a wearer; and
wherein, when the gaiter facemask is inserted over the face area of the wearer, the top elastic portion is configured to compress the top of the sheet around the face area of the wearer above a nose and around a top portion of a neck, and the bottom elastic portion is configured to compress the bottom of the sheet around a bottom portion of the neck.

13. The personal protective equipment face covering of claim 12, wherein the gaiter facemask further including a nose piece, the nose piece is affixed between the three layers of the inherently ionic fabric material along the top of the sheet and is configured to aid in positioning the top of the sheet above the nose of the wearer.

14. The personal protective equipment face covering of claim 13, wherein the nose piece including:
a foam material including:
a first rounded protruding member on a first side of the foam material configured to rest on a first side of the nose; and
a second rounded protruding member on a second side of the foam material configured to rest on a second side of the nose; and
wherein, the nose piece is configured to aid in positioning the top of the sheet above the nose of the wearer by placing the nose piece on top of the nose of the wearer with the first rounded protruding member on the first side of the nose and the second rounded protruding member on the second side of the nose, whereby a combination of the first rounded protruding member and the second rounded protruding member is configured to compress the nose therebetween.

15. The personal protective equipment face covering of claim 14, wherein the nose piece further including:
a first side member extending from the first rounded protruding member;
a second side member extending from the second rounded protruding member; and
a middle triangular member extending angularly from between the first rounded protruding member and the second rounded protruding member;
wherein, a combination of the first side member, the second side member, and the middle triangular member is configured to provide a space between the sheet of the three layers of the inherently ionic fabric material and the nose and a mouth of the wearer to aid in preventing a suction between the sheet of the three layers of the inherently ionic fabric material and the nose or the mouth of the wearer.

16. The personal protective equipment face covering of claim 11, wherein the personal protective equipment face covering is designed and configured as the wrap facemask including:
a sheet of the three layers of the inherently ionic fabric material, the sheet including a top elastic portion on a top of the sheet, and a bottom elastic portion on a bottom of the sheet, a first side and a second side of the sheet are removably attached together to form a loop configured to removably go around a face area of a wearer; and wherein, when the wrap facemask is wrapped around the face area of the wearer and the first side is attached to the second side, the top elastic portion is configured to compress the top of the sheet around the face area of the wearer above a nose and around a top portion of a neck, and the bottom elastic portion is configured to compress the bottom of the sheet around a bottom portion of the neck.

17. The personal protective equipment face covering of claim 16, wherein the wrap facemask further including a nose piece, the nose piece is affixed between the three layers of the inherently ionic fabric material along the top of the sheet and is configured to aid in positioning the top of the sheet above the nose of the wearer, wherein the nose piece including:
   a foam material including:
      a first rounded protruding member on a first side of the foam material configured to rest on a first side of the nose;
      a second rounded protruding member on a second side of the foam material configured to rest on a second side of the nose;
   wherein, the nose piece is configured to aid in positioning the top of the sheet above the nose of the wearer by placing the nose piece on top of the nose of the wearer with the first rounded protruding member on the first side of the nose and the second rounded protruding member on the second side of the nose, whereby a combination of the first rounded protruding member and the second rounded protruding member is configured to compress the nose therebetween;
   wherein, the nose piece further including:
      a first side member extending from the first rounded protrusion;
      a second side member extending from the second rounded protrusion; and
      a middle triangular member extending angularly from between the first rounded protruding member and the second rounded protruding member;
   wherein, a combination of the first side member, the second side member, and the middle triangular member is configured to provide a space between the sheet of the three layers of the inherently ionic fabric material and the nose and a mouth of the wearer to aid in preventing a suction between the sheet of the three layers of the inherently ionic fabric material and the nose or the mouth of the wearer.

18. The personal protective equipment face covering of claim 11, wherein the personal protective equipment face covering is designed and configured as the scarf facemask including:
   a middle patch section of the three layers of the inherently ionic fabric material, the middle patch section including a top elastic portion on a top of the middle patch section, and a bottom elastic portion on a bottom of the middle patch section,
   a first decorative side section is attached to a first side of the middle patch section;
   a second decorative side section is attached to a second side of the middle patch section; and wherein, when the scarf facemask is wrapped around the face area of the wearer with the middle patch section positioned over the face area, the top elastic portion and the bottom elastic portion are configured for maintaining the middle patch section over the face area of the wearer.

19. A personal protective equipment face covering comprising:
   at least two fabric materials;
   at least two layers, where each layer of the at least two layers includes at least one of the at least two fabric materials;
   at least one of the at least two fabric materials is an inherently positively charged ionic fabric material;
   at least one of the at least two fabric materials is an inherently negatively charged ionic fabric material;
   wherein the at least two layers comprising:
      a first layer of a polyester Crepe de Chine fabric being a first inherently negatively charged ionic fabric material;
      a second layer of the polyester Crepe de Chine fabric being a second inherently negatively charged ionic fabric material;
      a third layer of the silk Georgette or silk Habotai fabric being a first inherently positively charged ionic fabric material;
   wherein an ionic charge on the inherently positively charged ionic fabric material and the inherently negatively charged ionic fabric material comes from a molecular structure, and not from electrostatic charge or triboelectricity;
   wherein each of the at least two fabric materials comprise open weave fabrics configured to allow unrestricted airflow for inhalation and exhalation, whereby the personal protective equipment face covering is configured to allow less air to escape around a periphery of the personal protective equipment face covering compared to a conventional PPE mask;
   wherein the personal protective equipment face covering is configured to encircle a neck and a face area of a wearer, thereby protecting a greater area of skin compared to a conventional PPE mask, whereby a greater filtration surface area is provided compared to a surgical mask and an N95 respirator; and
   wherein the personal protective equipment face covering being designed and configured as:
      a gaiter facemask including three layers of the inherently ionic fabric material;
      a wrap facemask including the three layers of the inherently ionic fabric material; or
      a scarf facemask including the three layers of the inherently ionic fabric material.

20. A method of making a personal protective equipment face covering comprising:
   providing at least two fabric materials of inherently charged ionic fabric materials, wherein at least one of the at least two fabric materials is an inherently positively charged ionic fabric material, and at least one of the at least two fabric materials is an inherently negatively charged ionic fabric material; and
   sewing each of the at least two fabric materials of the inherently charged ionic fabric materials together to create the personal protective equipment face covering.

* * * * *